United States Patent
Dai et al.

(10) Patent No.: US 12,418,944 B2
(45) Date of Patent: Sep. 16, 2025

(54) RELAY COMMUNICATION METHOD AND COMMUNICATIONS APPARATUS

(71) Applicant: HUAWEI TECHNOLOGIES CO., LTD., Shenzhen (CN)

(72) Inventors: Mingzeng Dai, Shenzhen (CN); Peng Zhang, Shanghai (CN); Jun Wang, Shanghai (CN); Rongkuan Liu, Shanghai (CN); Qinghai Zeng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 511 days.

(21) Appl. No.: 17/851,725

(22) Filed: Jun. 28, 2022

(65) Prior Publication Data

US 2022/0330362 A1 Oct. 13, 2022

Related U.S. Application Data

(63) Continuation of application No. PCT/CN2020/138130, filed on Dec. 21, 2020.

(30) Foreign Application Priority Data

Dec. 30, 2019 (CN) .......................... 201911400008.6

(51) Int. Cl.
| | |
|---|---|
| *H04W 76/00* | (2018.01) |
| *H04W 8/00* | (2009.01) |
| *H04W 24/10* | (2009.01) |
| *H04W 72/121* | (2023.01) |
| *H04W 72/542* | (2023.01) |
| *H04W 76/11* | (2018.01) |
| *H04W 76/14* | (2018.01) |
| *H04W 88/04* | (2009.01) |

(52) U.S. Cl.
CPC ........... *H04W 76/14* (2018.02); *H04W 8/005* (2013.01); *H04W 24/10* (2013.01);
(Continued)

(58) Field of Classification Search
CPC ..... H04W 76/14; H04W 76/11; H04W 7/121; H04W 72/542; H04W 8/005; H04W 24/10

See application file for complete search history.

(56) References Cited

U.S. PATENT DOCUMENTS

| | | | |
|---|---|---|---|
| 2015/0230224 A1* | 8/2015 | Maaref | ................. H04L 5/0035 |
| | | | 455/451 |
| 2018/0054237 A1 | 2/2018 | Tseng et al. | |

(Continued)

FOREIGN PATENT DOCUMENTS

| | | | | |
|---|---|---|---|---|
| CA | 2727070 C | * | 12/2014 | ........ H04W 36/0033 |
| CN | 106470382 A | | 3/2017 | |

(Continued)

OTHER PUBLICATIONS

Extended European Search Report issued in corresponding European Application No. 20909581.9, dated May 2, 2023, pp. 1-6.

(Continued)

*Primary Examiner* — Erika A Washington
(74) *Attorney, Agent, or Firm* — HAUPTMAN HAM, LLP

(57) ABSTRACT

Embodiments of this application disclose a relay communication method and a communications apparatus, and relate to the field of communications technologies, to resolve a problem that communications system performance is unable to be met because remote UE selects relay UE to forward data in existing relay communication. The method includes a network device obtains a measurement report that includes signal quality of a sidelink (sidelink, SL) between first user equipment and at least one second user equipment and a radio network identifier of the at least one second user equipment. The network device selects target relay user equipment, of the first user equipment, from the at least one (Continued)

second user equipment based on the measurement report and selection assistance information associated with each second user equipment.

18 Claims, 10 Drawing Sheets

(52) U.S. Cl.
CPC ....... *H04W 72/121* (2013.01); *H04W 72/542* (2023.01); *H04W 76/11* (2018.02); *H04W 88/04* (2013.01)

(56) References Cited

U.S. PATENT DOCUMENTS

| | | |
|---|---|---|
| 2018/0084478 A1 | 3/2018 | Lee et al. |
| 2018/0139682 A1* | 5/2018 | Xu .................. H04W 40/22 |
| 2018/0324848 A1* | 11/2018 | Baghel .................. H04W 88/04 |
| 2020/0120745 A1* | 4/2020 | Yang .................. H04W 40/24 |

FOREIGN PATENT DOCUMENTS

| | | |
|---|---|---|
| CN | 108770074 A | 11/2018 |
| CN | 110461020 A | 11/2019 |
| WO | 2015117567 A1 | 8/2015 |
| WO | 2016183710 A1 | 11/2016 |

OTHER PUBLICATIONS

Chinese Office Action issued in corresponding Chinese Application No. 201911400008.6, dated Dec. 15, 2023, pp. 1-10.
Ericsson, UE-to-Network Relay selection. 3GPP TSG-RAN WG2 #90, Fukuoka, Japan, May 25-29, 2015, R2-152461, 6 pages.
Ericsson, Signalling required for UE-NW relay selection. 3GPP TSG-RAN WG2 #90, Fukuoka, Japan, May 25-29, 2015, R2-152462, 17 pages.
International Search Report issued in corresponding International Application No. PCT/CN2020/138130, dated Mar. 22, 2021, pp. 1-9.

* cited by examiner

RELAY COMMUNICATION METHOD AND COMMUNICATIONS APPARATUS

CROSS-REFERENCE TO RELATED APPLICATIONS

This application is a continuation of International Application No. PCT/CN2020/138130, filed on Dec. 21, 2020, which claims priority to Chinese Patent Application No. 201911400008.6, filed on Dec. 30, 2019. The disclosures of the aforementioned applications are hereby incorporated in entirety by reference.

BACKGROUND

Currently, to improve network system performance, for example, to enhance coverage and improve a system capacity, a mechanism of user equipment (user equipment, UE) cooperation communication is introduced into a 5th generation (5th generation, 5G) new radio (new radio, NR) system. For example, an operator deploys a plurality of cooperating user equipment (cooperating UEs, CUEs), and each CUE has a strong capability, and are installed with more receive antennas and transmit antennas. The CUE assists target user equipment (target UE, TUE) in forwarding data. For example, the TUE discovers and selects one appropriate CUE from the plurality of CUEs, establish a connection to the selected CUE, and use the CUE to send data to a network device or receive data sent by the network device. In this way, the coverage and the system capacity are improved.

In a conventional technology, a process of discovering and selecting CUE by TUE includes: The TUE sends a discovery request message to a plurality of CUEs. Each CUE sends a response message to the TUE after receiving the discovery request message. The TUE receives and measures the response messages sent by the plurality of CUEs, to obtain signal quality between each CUE and the TUE. The TUE selects, based on the signal quality between each CUE and the TUE, CUE for data forwarding in the plurality of CUEs, and communicates with a network device via the CUE.

In an existing procedure of discovering and selecting the CUE by the TUE, the TUE selects the CUE based on the signal quality between the TUE and the CUE, and forwards data via the selected CUE. However, the TUE monitors a status of a channel between the TUE and CUE, and information for CUE selection is limited. Consequently, performance of the selected CUE is not good enough, and data forwarding performed via the CUE selected by the TUE is unable to meet a performance condition of a network system.

SUMMARY

Embodiments of this application provide a relay communication method and a communications apparatus, to resolve a problem that communications system performance is unable to be met because relay UE is selected by remote UE to forward data in existing relay communication.

To achieve the foregoing objective, the following technical solution is used in embodiments of this application.

According to a first aspect, this application provides a relay communication method. The method includes: A network device obtains a measurement report that includes signal quality of a sidelink (sidelink, SL) between first user equipment and at least one second user equipment and a radio network identifier of the at least one second user equipment. The network device selects target relay user equipment, of the first user equipment, from the at least one second user equipment based on the measurement report and selection assistance information associated with each second user equipment.

According to the method in the first aspect, the network device selects the appropriate target relay user equipment based on signal quality of an SL between the first user equipment and second user equipment, the selection assistance information associated with each second user equipment, and the like, and notify the first user equipment of the selected relay user equipment. After receiving a selection result of the network device, the first user equipment is triggered to establish an SL connection to the selected relay user equipment, and communicates with the network device via the relay user equipment that establishes the SL connection to the first user equipment. In this way, the network device selects the appropriate relay user equipment based on an entire-network communication status such as a communication status between the first user equipment and the second user equipment and other selection assistance information. Selecting the appropriate relay user equipment by comprehensively considering entire-network system performance improves reliability of data transmission performed by remote user equipment via the relay user equipment, and improves a performance condition of a network system.

In a possible implementation, with reference to the first aspect, the selection assistance information includes one or more of the following information: subscription information of the second user equipment, air interface signal quality of the second user equipment, air interface signal quality of the first user equipment, load information of the second user equipment, and interference information of the second user equipment.

Based on the possible implementation, parameter information that affects communication between the first user equipment and the second user equipment, parameter information that affects air interface communication between the second user equipment and the network device, and the like are used as the selection assistance information for the network device to select the appropriate relay user equipment. In this way, factors that affect relay communication is considered more comprehensively and systematically, to improve accuracy of the selected relay user equipment and improve system performance.

In a possible implementation, with reference to any one of the first aspect or the possible implementation of the first aspect, that a network device obtains a measurement report includes: The network device receives the measurement report from the first user equipment over an air interface between the network device and the first user equipment. Alternatively, the network device receives the measurement report from one second user equipment selected by the first user equipment from the at least one second user equipment. Alternatively, the network device receives signal quality of a sidelink between each second user equipment and the first user equipment and a radio network identifier of the second user equipment from the second user equipment over an air interface between the network device and the second user equipment.

Based on the possible implementation, the network device directly receives the measurement report sent by the first user equipment, receives the measurement report sent by the first user equipment via the relay user equipment, or receives the signal quality between each second user equipment and the first user equipment and the radio network identifier of the second user equipment that are sent by the second user equipment, and include, in the measurement report, the information sent by the second user equipment. In this way, the network device obtains the measurement report in a plurality of possible manners, to improve flexibility and diversity of obtaining the measurement report.

In a possible implementation, with reference to any one of the first aspect or the possible implementations of the first aspect, the method further includes: The network device obtains a sidelink identifier that is of the at least one second user equipment and that is used for SL communication between the first user equipment and the second user equipment.

Based on the possible implementation, the network device obtains a sidelink identifier of each second user equipment, so that the network device sends the obtained sidelink identifier of the second user equipment to the first user equipment. The first user equipment establishes an SL connection to the second user equipment based on the sidelink identifier of the second user equipment, and performs SL communication by using the sidelink identifier of the second user equipment as a destination address. Implementation is simple and practicable.

In a possible implementation, with reference to any one of the first aspect or the possible implementations of the first aspect, the method further includes: The network device sends a radio network identifier of the target relay user equipment and/or a sidelink identifier of the target relay user equipment to the first user equipment.

Based on the possible implementation, the network device sends one or more of the radio network identifier and the sidelink identifier that are of the target relay user equipment to the first user equipment, so that the first user equipment establishes the SL connection to the second user equipment based on the received information, to perform SL communication. Implementation is simple and practicable.

In a possible implementation, with reference to any one of the first aspect or the possible implementations of the first aspect, the method further includes: The network device obtains a radio network identifier of the first user equipment and/or a sidelink identifier of the first user equipment, where the radio network identifier of the first user equipment is allocated by the network device, and the sidelink identifier of the first user equipment is used for SL communication between the first user equipment and the at least one second user equipment.

Based on the possible implementation, the network device obtains the radio network identifier and the sidelink identifier that are of the first user equipment, so that the network device sends the obtained radio network identifier and/or sidelink identifier of the first user equipment to the second user equipment. The second user equipment establishes the SL connection to the first user equipment based on the sidelink identifier of the first user equipment, and performs SL communication by using the sidelink identifier of the first user equipment as a destination address. Implementation is simple and practicable.

In a possible implementation, with reference to any one of the first aspect or the possible implementations of the first aspect, the method further includes: The network device sends, to the target relay user equipment, an announcement message used to trigger the target relay user equipment to establish an SL connection to the first user equipment, where the announcement message includes the radio network identifier of the first user equipment and/or the sidelink identifier of the first user equipment.

Based on the possible implementation, the network device is unable to notifies the selected target relay user equipment of one or more of the following information: the radio network identifier and the sidelink identifier that are of the first user equipment, so that the target relay user equipment initiates establishment of the SL connection to the first user equipment based on one or more of the following information: the radio network identifier and the sidelink identifier that are of the first user equipment, and performs SL communication through the established SL connection. Implementation is simple and practicable.

In a possible implementation, with reference to any one of the first aspect or the possible implementations of the first aspect, the method further includes: The network device sends, to the target relay user equipment, group scheduling information used to schedule data of communication between the first user equipment and the network device, where the group scheduling information includes a group radio network temporary identifier (group radio network temporary identifier, G-RNTI) for group scheduling and time-frequency domain information for group scheduling.

Based on the possible implementation, the network device sends the group scheduling information to the selected target relay user equipment, so that the relay user equipment monitors the corresponding G-RNTI on a time domain resource and a frequency domain resource that are indicated by the time-frequency domain information, and receives the data forwarded to the first user equipment. In this way, the network device multicasts the data of the first user equipment to a plurality of relay user equipment, so that the plurality of relay user equipment simultaneously forward the data for the first user equipment, to improve data transmission efficiency and reliability.

In a possible implementation, with reference to any one of the first aspect or the possible implementations of the first aspect, the method further includes: The network device configures, for the first user equipment, a trigger condition used to trigger the first user equipment to send a discovery request message to the at least one second user equipment.

Based on the possible implementation, the network device configures, for the first user equipment, the trigger condition for triggering the first user equipment to initiate a discovery procedure, so that the first user equipment sends the discovery request message to the at least one second user equipment when the trigger condition is met. This sets a time limit for initiating the discovery procedure, so that the first user equipment initiates the discovery procedure when an appropriate trigger condition is met. This avoids a problem of high power consumption caused by initiating the discovery procedure by the first user equipment at any time.

In a possible implementation, with reference to any one of the first aspect or the possible implementations of the first aspect, the trigger condition includes that the air interface signal quality of the first user equipment is less than or equal to a first threshold.

Based on the possible implementation, that the air interface signal quality of the first user equipment is less than or equal to a first threshold is set as the trigger condition for initiating the discovery procedure by the first user equipment, so that the first user equipment initiates the discovery procedure when the air interface signal quality is poor and relay user equipment needs to perform data forwarding. This improves data transmission reliability.

According to a second aspect, this application provides a communications apparatus. The communications apparatus is a network device or a chip or a system-on-a-chip in the network device, or is a functional module that is in the network device and that is configured to implement the method according to any one of the first aspect or the possible designs of the first aspect. The communications apparatus implements functions performed by the network device in the foregoing aspect or the possible designs, and the functions are implemented by hardware by executing corresponding software. The hardware or the software includes one or more modules corresponding to the functions. For example, the communications apparatus includes an obtaining unit and a selection unit.

The obtaining unit is configured to obtain a measurement report that includes signal quality of an SL between first user equipment and at least one second user equipment and a radio network identifier of the at least one second user equipment.

The selection unit is configured to select target relay user equipment, of the first user equipment, from the at least one second user equipment based on the measurement report and selection assistance information associated with each second user equipment.

For an implementation of the communications apparatus, refer to behavior functions of the network device in the relay communication method provided in any one of the first aspect or the possible designs of the first aspect.

Based on the apparatus according to the second aspect, the communications apparatus selects the appropriate target relay user equipment based on signal quality of an SL between the first user equipment and second user equipment, the selection assistance information associated with each second user equipment, and the like, and notify the first user equipment of the selected relay UE. After receiving a selection result of the communications apparatus, the first user equipment is triggered to establish an SL connection to the selected relay user equipment, and communicates with the communications apparatus via the relay user equipment that establishes the SL connection to the first user equipment. In this way, the communications apparatus selects the appropriate relay user equipment based on an entire-network communication status such as a communication status between the first user equipment and the second user equipment and other selection assistance information. Selecting the appropriate relay user equipment by comprehensively considering entire-network system performance improves reliability of data transmission performed by remote user equipment via the relay user equipment, and improves a performance condition of a network system.

In a possible implementation, with reference to the second aspect, the selection assistance information includes one or more of the following information: subscription information of the second user equipment, air interface signal quality of the second user equipment, air interface signal quality of the first user equipment, load information of the second user equipment, and interference information of the second user equipment.

Based on the possible implementation, parameter information that affects communication between the first user equipment and the second user equipment, parameter information that affects air interface communication between the second user equipment and the communications apparatus, and the like is used as the selection assistance information for the communications apparatus to select the appropriate relay user equipment. In this way, factors that affect relay communication is considered more comprehensively and systematically, to improve accuracy of the selected relay user equipment and improve system performance.

In a possible implementation, with reference to any one of the second aspect or the possible implementation of the second aspect, the obtaining unit is configured to: receive the measurement report from the first user equipment over an air interface between the communications apparatus and the first user equipment; receive the measurement report from one second user equipment selected by the first user equipment from the at least one second user equipment; or receive signal quality of a sidelink between each second user equipment and the first user equipment and a radio network identifier of the second user equipment from the second user equipment over an air interface between the communications apparatus and the second user equipment.

Based on the possible implementation, the communications apparatus directly receives the measurement report sent by the first user equipment, receives the measurement report sent by the first user equipment via the relay user equipment, or receives the signal quality between each second user equipment and the first user equipment and the radio network identifier of the second user equipment that are sent by the second user equipment, and include, in the measurement report, the information sent by the second user equipment. In this way, the communications apparatus obtains the measurement report in a plurality of possible manners, to improve flexibility and diversity of obtaining the measurement report.

In a possible implementation, with reference to any one of the second aspect or the possible implementations of the second aspect, the obtaining unit is further configured to obtain a sidelink identifier that is of the at least one second user equipment and that is used for SL communication between the first user equipment and the second user equipment.

Based on the possible implementation, the communications apparatus obtains a sidelink identifier of each second user equipment, so that the communications apparatus sends the obtained sidelink identifier of the second user equipment to the first user equipment. The first user equipment establishes an SL connection to the second user equipment based on the sidelink identifier of the second user equipment, and performs SL communication by using the sidelink identifier of the second user equipment as a destination address. Implementation is simple and practicable.

In a possible implementation, with reference to any one of the second aspect or the possible implementations of the second aspect, the communications apparatus further includes: a sending unit, configured to send a radio network identifier of the target relay user equipment and/or a sidelink identifier of the target relay user equipment to the first user equipment.

Based on the possible implementation, the communications apparatus sends one or more of the radio network identifier and the sidelink identifier that are of the target relay user equipment to the first user equipment, so that the first user equipment establishes the SL connection to the second user equipment based on the received information, to perform SL communication. Implementation is simple and practicable.

In a possible implementation, with reference to any one of the second aspect or the possible implementations of the second aspect, the obtaining unit is further configured to obtain a radio network identifier of the first user equipment and/or a sidelink identifier of the first user equipment, where the radio network identifier of the first user equipment is allocated by the communications apparatus, and the sidelink identifier of the first user equipment is used for SL communication between the first user equipment and the at least one second user equipment.

Based on the possible implementation, the communications apparatus obtains the radio network identifier and the sidelink identifier that are of the first user equipment, so that the communications apparatus sends the obtained radio network identifier and/or sidelink identifier of the first user equipment to the second user equipment. The second user equipment establishes the SL connection to the first user equipment based on the sidelink identifier of the first user equipment, and performs SL communication by using the sidelink identifier of the first user equipment as a destination address. Implementation is simple and practicable.

In a possible implementation, with reference to any one of the second aspect or the possible implementations of the second aspect, the method further includes: a sending unit, configured to send, to the target relay user equipment, an announcement message used to trigger the target relay user equipment to establish an SL connection to the first user equipment, where the announcement message includes the radio network identifier of the first user equipment and/or the sidelink identifier of the first user equipment.

Based on the possible implementation, the communications apparatus is unable to notifies the selected target relay user equipment of one or more of the following information: the radio network identifier and the sidelink identifier that are of the first user equipment, so that the target relay user equipment initiates establishment of the SL connection to the first user equipment based on one or more of the following information: the radio network identifier and the sidelink identifier that are of the first user equipment, and performs SL communication through the established SL connection. Implementation is simple and practicable.

In a possible implementation, with reference to any one of the second aspect or the possible implementations of the second aspect, the method further includes: a sending unit, configured to send, to the target relay user equipment, group scheduling information used to schedule data of communication between the first user equipment and the communications apparatus, where the group scheduling information includes a group radio network temporary identifier (group radio network temporary identifier, G-RNTI) for group scheduling and time-frequency domain information for group scheduling.

Based on the possible implementation, the communications apparatus sends the group scheduling information to the selected target relay user equipment, so that the relay user equipment monitors the corresponding G-RNTI on a time domain resource and a frequency domain resource that are indicated by the time-frequency domain information, and receives the data forwarded to the first user equipment. In this way, the communications apparatus multicasts the data of the first user equipment to a plurality of relay user equipment, so that the plurality of relay user equipment simultaneously forward the data for the first user equipment, to improve data transmission efficiency and reliability.

In a possible implementation, with reference to any one of the second aspect or the possible implementations of the second aspect, the method further includes: a configuration unit, configured to configure, for the first user equipment, a trigger condition used to trigger the first user equipment to send a discovery request message to the at least one second user equipment.

Based on the possible implementation, the communications apparatus configures, for the first user equipment, the trigger condition for triggering the first user equipment to initiate a discovery procedure, so that the first user equipment sends the discovery request message to the at least one second user equipment when the trigger condition is met. This sets a time limit for initiating the discovery procedure, so that the first user equipment initiates the discovery procedure when an appropriate trigger condition is met. This avoids a problem of high power consumption caused by initiating the discovery procedure by the first user equipment at any time.

In a possible implementation, with reference to any one of the second aspect or the possible implementations of the second aspect, the trigger condition includes that the air interface signal quality of the first user equipment is less than or equal to a first threshold.

Based on the possible implementation, that the air interface signal quality of the first user equipment is less than or equal to a first threshold is set as the trigger condition for initiating the discovery procedure by the first user equipment, so that the first user equipment initiates the discovery procedure when the air interface signal quality is poor and relay user equipment needs to perform data forwarding. This improves data transmission reliability.

According to a third aspect, a communications apparatus is provided. The communications apparatus is a network device, or a chip or a system-on-a-chip in the network device. The communications apparatus implements functions performed by the network device in the foregoing aspects or possible designs. The functions are implemented by hardware. For example, in a possible design, the communications apparatus includes a processor and a transceiver. The processor is configured to obtain a measurement report that includes signal quality of an SL between first user equipment and at least one second user equipment and a radio network identifier of the at least one second user equipment via the transceiver. The network device selects target relay user equipment, of the first user equipment, from the at least one second user equipment based on the measurement report and selection assistance information associated with each second user equipment. In another possible design, the communications apparatus further includes a memory. The memory is configured to store computer-executable instructions and data for the communications apparatus. When the communications apparatus runs, the processor executes the computer-executable instructions stored in the memory, so that the communications apparatus performs the relay communication method according to any one of the first aspect or the possible designs of the first aspect.

According to a fourth aspect, a computer-readable storage medium is provided. The computer-readable storage medium is a readable non-volatile storage medium. The computer-readable storage medium stores computer instructions or a program. When the computer instructions or the program is run on a computer, the computer is enabled to perform the relay communication method according to any one of the first aspect or the possible designs of the foregoing aspect.

According to a fifth aspect, a computer program product including instructions is provided. When the computer program product runs on a computer, the computer is enabled to perform the relay communication method according to any one of the first aspect or the possible designs of the foregoing aspect.

According to a sixth aspect, a communications apparatus is provided. The communications apparatus is a network device, or a chip or a system-on-a-chip in the network device. The communications apparatus includes one or more processors and one or more memories. The one or more memories are coupled to the one or more processors, and the one or more memories are configured to store computer program code. The computer program code includes computer instructions. When the one or more processors execute the computer instructions, the communications apparatus is enabled to perform the relay communication method according to any one of the first aspect or the possible designs of the first aspect.

According to a seventh aspect, a chip system is provided. The chip system includes one or more processors and one or more memories. The one or more memories are coupled to the one or more processors, and the one or more memories store computer program code or computer instructions. When the one or more processors execute the computer program code or the computer instructions, the chip system is enabled to perform the relay communication method according to any one of the first aspect or the possible designs of the first aspect.

For technical effects achieved by any one of the design manners of the third aspect to the seventh aspect, refer to the technical effects achieved by any one of the first aspect or the possible designs of the first aspect. Details are not described again.

According to an eighth aspect, an embodiment of this application provides another relay communication method. The method includes: First user equipment sends a measurement report that includes signal quality of a sidelink between the first user equipment and at least one second user equipment and a radio network identifier of the at least one second user equipment to a network device, and receives a radio network identifier of target relay user equipment from the network device, where the target relay user equipment is one second user equipment selected from the at least one second user equipment. The first user equipment establishes a sidelink SL connection to the target relay user equipment based on the radio network identifier of the target relay user equipment, and communicates with the network device via the target relay user equipment.

According to the method in the eighth aspect, the first user equipment sends the signal quality between the first user equipment and the at least one second user equipment to the network device, so that the network device selects the appropriate target relay user equipment based on signal quality of an SL between the first user equipment and second user equipment, selection assistance information associated with each second user equipment, and the like, and notifies the first user equipment of the selected relay user equipment. After receiving a selection result of the network device, the first user equipment is triggered to establish the SL connection to the selected relay user equipment, and communicates with the network device via the relay user equipment that establishes the SL connection to the first user equipment. The network device selects the appropriate relay user equipment based on an entire-network communication status such as a communication status between the first user equipment and the second user equipment and other selection assistance information. Selecting the appropriate relay user equipment by comprehensively considering entire-network system performance improves reliability of data transmission performed by remote user equipment via the relay user equipment, and improves a performance condition of a network system.

In a possible implementation, with reference to the eighth aspect, that first user equipment sends a measurement report to a network device includes: The first user equipment sends the measurement report to the network device over an air interface between the first user equipment and the network device. Alternatively, the first user equipment sends the measurement report to the network device via initial relay user equipment, where the initial relay user equipment establishes an SL connection to the first user equipment, and the initial relay user equipment is one second user equipment selected by the first user equipment from the at least one second user equipment.

Based on the possible implementation, the first user equipment directly sends the measurement report to the network device over the air interface, or sends the measurement report to the network device via the initially selected relay user equipment. In this way, the first user equipment sends the measurement report to the network device in a plurality of possible manners, to improve flexibility and diversity of sending the measurement report.

In a possible implementation, with reference to any one of the eighth aspect or the possible implementations of the eighth aspect, if the initial relay user equipment is different from the target relay user equipment, before the first user equipment establishes the SL connection to the target relay user equipment, the method further includes: The first user equipment releases the SL connection between the first user equipment and the initial relay user equipment.

Based on the possible implementation, when the first user equipment sends the measurement report to the network device via the initially selected relay user equipment, if the relay user equipment selected by the network device is different from the initially selected relay user equipment, the first user equipment releases the established SL connection, and establishes the SL connection to the relay user equipment selected by the network device, to adjust an SL in a timely manner, so that the first user equipment selects relay user equipment when the first user equipment is not in coverage of the network device.

In a possible implementation, with reference to any one of the eighth aspect or the possible implementations of the eighth aspect, the method further includes: The first user equipment sends, to the network device, a sidelink identifier that is of the at least one second user equipment and that is used for SL communication between the first user equipment and the second user equipment.

Based on the possible implementation, the first user equipment sends a sidelink identifier of each second user equipment to the network device, so that one or more pieces of information in a sidelink identifier of the second user equipment that is selected by the network device and that is used to forward data are sent to the first user equipment. In this way, the first user equipment establishes the SL connection to the second user equipment based on the received information, and performs SL communication. Implementation is simple and practicable.

In a possible implementation, with reference to any one of the eighth aspect or the possible implementations of the eighth aspect, the method further includes: The first user equipment sends a radio network identifier of the first user equipment and/or a sidelink identifier of the first user equipment to the network device, where the radio network identifier of the first user equipment is allocated by the network device, and the sidelink identifier of the first user equipment is used for SL communication between the first user equipment and the at least one second user equipment.

Based on the possible implementation, the first user equipment sends, to the network device, any one or more of the following information: the radio network identifier and the sidelink identifier that are of the first user equipment, so that the network device sends the obtained radio network identifier and/or sidelink identifier of the first user equipment to the selected second user equipment used for data forwarding. The second user equipment establishes the SL connection to the first user equipment based on the sidelink identifier of the first user equipment, and performs SL communication by using the sidelink identifier of the first user equipment as a destination address. Implementation is simple and practicable.

In a possible implementation, with reference to any one of the eighth aspect or the possible implementations of the eighth aspect, the method further includes: The first user equipment sends a discovery request message to the at least one second user equipment when a trigger condition is met, receives a response message from the at least one second user equipment, and measures the signal quality of the sidelink between the first user equipment and the at least one second user equipment, to obtain the measurement report.

Based on the possible implementation, the first user equipment sends the discovery request message to the second user equipment when the trigger condition is met. This sets a time limit for initiating a discovery procedure, so that the first user equipment initiates the discovery procedure when an appropriate trigger condition is met. This avoids a problem of high power consumption caused by initiating the discovery procedure by the first user equipment at any time.

In a possible implementation, with reference to any one of the eighth aspect or the possible implementations of the eighth aspect, the trigger condition includes that air interface signal quality of the first user equipment is less than or equal to a first threshold, and the trigger condition is configured by the network device for the first user equipment.

Based on the possible implementation, that air interface signal quality of the first user equipment is less than or equal to a first threshold is set as the trigger condition for initiating the discovery procedure by the first user equipment, so that the first user equipment initiates the discovery procedure when the air interface signal quality is poor and relay user equipment needs to perform data forwarding. This improves data transmission reliability.

According to a ninth aspect, this application provides a communications apparatus. The communications apparatus is first user equipment or a chip or a system-on-a-chip in the first user equipment, or is a functional module that is in the first user equipment and that is configured to implement the method according to any one of the eighth aspect or the possible designs of the eighth aspect. The communications apparatus implements functions performed by the first user equipment in the eighth aspect or the possible designs of the eighth aspect, and the functions are implemented by hardware by executing corresponding software. The hardware or the software includes one or more modules corresponding to the functions. For example, the communications apparatus includes a sending unit, a receiving unit, and an establishment unit.

The sending unit is configured to send a measurement report that includes signal quality of a sidelink between the communications apparatus and at least one second user equipment and a radio network identifier of the at least one second user equipment to a network device.

The receiving unit is configured to receive a radio network identifier of target relay user equipment from the network device, where the target relay user equipment is one second user equipment selected from the at least one second user equipment.

The establishment unit is configured to: establish a sidelink SL connection to the target relay user equipment based on the radio network identifier of the target relay user equipment, and communicate with the network device via the target relay user equipment.

According to the method in the ninth aspect, the communications apparatus sends the signal quality between the communications apparatus and the at least one second user equipment to the network device, so that the network device selects the appropriate target relay user equipment based on signal quality of an SL connection between the communications apparatus and second user equipment, selection assistance information associated with each second user equipment, and the like, and notifies the communications apparatus of the selected relay user equipment. After receiving a selection result of the network device, the communications apparatus is triggered to establish the SL connection to the selected relay user equipment, and communicates with the network device via the relay user equipment that establishes the SL connection to the communications apparatus. The network device selects the appropriate relay user equipment based on an entire-network communication status such as a communication status between the communications apparatus and the second user equipment and other selection assistance information. Selecting the appropriate relay user equipment by comprehensively considering entire-network system performance improves reliability of data transmission performed by remote user equipment via the relay user equipment, and improves a performance condition of a network system.

In a possible implementation, with reference to the ninth aspect, the sending unit is configured to: send the measurement report to the network device over an air interface between the communications apparatus and the network device, or send the measurement report to the network device via initial relay user equipment, where the initial relay user equipment establishes an SL connection to the communications apparatus, and the initial relay user equipment is one second user equipment selected by the communications apparatus from the at least one second user equipment.

Based on the possible implementation, the communications apparatus directly sends the measurement report to the network device over the air interface, or sends the measurement report to the network device via the initially selected relay user equipment. In this way, the communications apparatus sends the measurement report to the network device in a plurality of possible manners, to improve flexibility and diversity of sending the measurement report.

In a possible implementation, with reference to any one of the ninth aspect or the possible implementation of the ninth aspect, if the initial relay user equipment is different from the target relay user equipment, before the communications apparatus establishes the SL connection to the target relay user equipment, the communications apparatus further includes: a release unit, configured to release the SL connection between the communications apparatus and the initial relay user equipment.

Based on the possible implementation, when the communications apparatus sends the measurement report to the network device via the initially selected relay user equipment, if the relay user equipment selected by the network device is different from the initially selected relay user equipment, the communications apparatus releases the established SL connection, and establishes the SL connection to the relay user equipment selected by the network device, to adjust an SL in a timely manner, so that the communications apparatus selects relay user equipment when the communications apparatus is not in coverage of the network device.

In a possible implementation, with reference to any one of the ninth aspect or the possible implementations of the ninth aspect, the sending unit is configured to send, to the network device, a sidelink identifier that is of the at least one second user equipment and that is used for SL communication between the communications apparatus and the second user equipment.

Based on the possible implementation, the communications apparatus sends a sidelink identifier of each second user equipment to the network device, so that one or more pieces of information in a sidelink identifier of the second user equipment that is selected by the network device and that is used to forward data are sent to the communications apparatus. In this way, the communications apparatus establishes the SL connection to the second user equipment based on the received information, and performs SL communication. Implementation is simple and practicable.

In a possible implementation, with reference to any one of the ninth aspect or the possible implementations of the ninth aspect, the sending unit is further configured to send a radio network identifier of the communications apparatus and/or a sidelink identifier of the communications apparatus to the network device, where the radio network identifier of the communications apparatus is allocated by the network device, and the sidelink identifier of the communications apparatus is used for SL communication between the communications apparatus and the at least one second user equipment.

Based on the possible implementation, the communications apparatus sends, to the network device, any one or more of the following information: the radio network identifier and the sidelink identifier that are of the communications apparatus, so that the network device sends the obtained radio network identifier and/or sidelink identifier of the communications apparatus to the selected second user equipment used for data forwarding. The second user equipment establishes the SL connection to the communications apparatus based on the sidelink identifier of the communications apparatus, and performs SL communication by using the sidelink identifier of the communications apparatus as a destination address. Implementation is simple and practicable.

In a possible implementation, with reference to any one of the ninth aspect or the possible implementations of the ninth aspect, the sending unit is configured to send a discovery request message to the at least one second user equipment when a trigger condition is met, the receiving unit is further configured to receive a response message from the at least one second user equipment, and the communications apparatus further includes a measurement unit, configured to measure the signal quality of the sidelink between the communications apparatus and the at least one second user equipment, to obtain the measurement report.

Based on the possible implementation, the communications apparatus sends the discovery request message to the second user equipment when the trigger condition is met. This sets a time limit for initiating a discovery procedure, so that the communications apparatus initiates the discovery procedure when an appropriate trigger condition is met. This avoids a problem of high power consumption caused by initiating the discovery procedure by the communications apparatus at any time.

In a possible implementation, with reference to any one of the ninth aspect or the possible implementations of the ninth aspect, the trigger condition includes that air interface signal quality of the communications apparatus is less than or equal to a first threshold.

Based on the possible implementation, that air interface signal quality of the communications apparatus is less than or equal to a first threshold is set as the trigger condition for initiating the discovery procedure by the communications apparatus, so that the communications apparatus initiates the discovery procedure when the air interface signal quality is poor and relay user equipment needs to perform data forwarding. This improves data transmission reliability.

According to a tenth aspect, a communications apparatus is provided. The communications apparatus is first user equipment, or a chip or a system-on-a-chip in the first user equipment. The communications apparatus implements functions performed by the first user equipment in the foregoing aspects or possible designs. The functions are implemented by hardware. For example, in a possible design, the communications apparatus includes a processor and a transceiver. The processor uses the transceiver to send a measurement report that includes signal quality of a sidelink between the communications apparatus and at least one second user equipment and a radio network identifier of the at least one second user equipment to a network device, and receive a radio network identifier of target relay user equipment from the network device, establishes a sidelink SL connection to the target relay user equipment based on the radio network identifier of the target relay user equipment, and communicates with the network device via the target relay user equipment. In another possible design, the communications apparatus further includes a memory. The memory is configured to store computer-executable instructions and data for the communications apparatus. When the communications apparatus runs, the processor executes the computer-executable instructions stored in the memory, so that the communications apparatus performs the relay communication method according to any one of the eighth aspect or the possible designs of the eighth aspect.

According to an eleventh aspect, a computer-readable storage medium is provided. The computer-readable storage medium is a readable non-volatile storage medium. The computer-readable storage medium stores computer instructions. When the computer instructions are run on a computer, the computer is enabled to perform the relay communication method according to any one of the eighth aspect or the possible designs of the foregoing aspect.

According to a twelfth aspect, a computer program product including instructions is provided. When the computer program product runs on a computer, the computer is enabled to perform the relay communication method according to any one of the eighth aspect or the possible designs of the foregoing aspect.

According to a thirteenth aspect, a communications apparatus is provided. The communications apparatus is first user equipment or a chip or a system-on-a-chip in the first user equipment. The communications apparatus includes one or more processors and one or more memories. The one or more memories are coupled to the one or more processors, and the one or more memories are configured to store computer program code. The computer program code includes computer instructions. When the one or more processors execute the computer instructions, the communications apparatus is enabled to perform the relay communication method according to any one of the eighth aspect or the possible designs of the eighth aspect.

According to a fourteenth aspect, a chip system is provided. The chip system includes one or more processors and one or more memories. The one or more memories are coupled to the one or more processors, and the one or more memories store computer program code or computer instructions. When the one or more processors execute the computer program code or the computer instructions, the chip system is enabled to perform the relay communication method according to any one of the eighth aspect or the possible designs of the eighth aspect.

For technical effects achieved by any one of the designs of the ninth aspect to the fourteenth aspect, refer to the technical effects achieved by any one of the seventh aspect or the possible designs of the seventh aspect. Details are not described again.

According to a fifteenth aspect, a relay communication method is provided. The method includes: Second user equipment receives a discovery request message from first user equipment, obtains signal quality of a sidelink between the second user equipment and the first user equipment through measurement based on the discovery request message, and sends, to a network device, the signal quality of the sidelink between the second user equipment and the first user equipment and a radio network identifier that is of the second user equipment and that is used by the network device to uniquely identify the second user equipment.

According to the method in the fifteenth aspect, the second user equipment measures the signal quality between the first user equipment and the second user equipment, and report the signal quality to the network device, so that the network device selects appropriate target relay user equipment based on the signal quality of the SL between the first user equipment and the second user equipment, selection assistance information associated with each second user equipment, and the like, and notifies the first user equipment of the selected relay user equipment. The first user equipment is triggered to establish an SL connection to the selected relay user equipment, and communicates with the network device via the relay user equipment that establishes the SL connection to the first user equipment. In this way, the network device selects the appropriate relay user equipment based on an entire-network communication status such as a communication status between the first user equipment and the second user equipment and other selection assistance information. Selecting the appropriate relay user equipment by comprehensively considering entire-network system performance improves reliability of data transmission performed by remote user equipment via the relay user equipment, and improves a performance condition of a network system.

In a possible implementation, with reference to any one of the fifteenth aspect or the possible implementations of the fifteenth aspect, the method further includes: The second user equipment sends, to the network device, a sidelink identifier that is of the second user equipment and that is used for SL communication between the first user equipment and the second user equipment.

Based on the possible implementation, the second user equipment sends the sidelink identifier of the second user equipment to the network device, so that the network device sends the obtained sidelink identifier of the second user equipment to the first user equipment. The first user equipment establishes an SL connection to the second user equipment based on the sidelink identifier of the second user equipment, and performs SL communication by using the sidelink identifier of the second user equipment as a destination address. Implementation is simple and practicable.

In a possible implementation, with reference to any one of the fifteenth aspect or the possible implementations of the fifteenth aspect, if the second user equipment is target relay user equipment, the method further includes: The second user equipment receives, from the network device, an announcement message used to trigger the target relay user equipment to establish a sidelink SL connection to the first user equipment, where the announcement message includes a radio network identifier of the first user equipment and/or a sidelink identifier of the first user equipment.

Based on the possible implementation, when the second user equipment is used for forwarding data, the second user equipment establishes the SL connection between the second user equipment and the first user equipment. Implementation is simple and practicable.

In a possible implementation, with reference to any one of the fifteenth aspect or the possible implementations of the fifteenth aspect, the method further includes: The second user equipment receives, from the network device, group scheduling information used to schedule data of communication between the first user equipment and the network device, where the group scheduling information includes a G-RNTI for group scheduling and time-frequency domain information for group scheduling.

Based on the possible implementation, the second user equipment receives the group scheduling information from the network device, monitors the corresponding G-RNTI on a time domain resource and a frequency domain resource that are indicated by the time-frequency domain information, receive the data forwarded by the network device to the first user equipment, and send the received data to the first user equipment, to improve data transmission efficiency and reliability.

According to a sixteenth aspect, this application provides a communications apparatus. The communications apparatus is second user equipment or a chip or a system-on-a-chip in the second user equipment, or is a functional module that is in the second user equipment and that is configured to implement the method according to any one of the fifteenth aspect or the possible designs of the fifteenth aspect. The communications apparatus implements functions performed by the second user equipment in the fifteenth aspect or the possible designs of the fifteenth aspect, and the functions are implemented by hardware by executing corresponding software. The hardware or the software includes one or more modules corresponding to the functions. For example, the communications apparatus includes a receiving unit, a measurement unit, and a sending unit.

The receiving unit is configured to receive a discovery request message from first user equipment.

The measurement unit is configured to obtain signal quality of a sidelink between the communications apparatus and the first user equipment through measurement based on the discovery request message.

The sending unit is configured to send, to a network device, the signal quality of the sidelink between the second user equipment and the first user equipment and a radio network identifier that is of the second user equipment and that is used by the network device to uniquely identify the second user equipment.

According to the method in the fifteenth aspect, the communications apparatus measures the signal quality between the first user equipment and the communications apparatus, and report the signal quality to the network device, so that the network device selects appropriate target relay user equipment based on the signal quality of the SL between the first user equipment and the communications apparatus, selection assistance information associated with each communications apparatus, and the like, and notifies the first user equipment of the selected relay user equipment. The first user equipment is triggered to establish an SL connection to the selected relay user equipment, and communicates with the network device via the relay user equipment that establishes an SL to the first user equipment. In this way, the network device selects the appropriate relay user equipment based on an entire-network communication status such as a communication status between the communications apparatus and the first user equipment and other selection assistance information. Selecting the appropriate relay user equipment by comprehensively considering entire-network system performance improves reliability of data transmission performed by remote user equipment via the relay user equipment, and improves a performance condition of a network system.

In a possible implementation, with reference to any one of the sixteenth aspect or the possible implementations of the fifteenth aspect, the sending unit is further configured to send, to the network device, a sidelink identifier that is of the communications apparatus and that is used for SL communication between the first user equipment and the communications apparatus.

Based on the possible implementation, the communications apparatus sends the sidelink identifier of the communications apparatus to the network device, so that the network device sends the obtained sidelink identifier of the communications apparatus to the first user equipment. The first user equipment establishes an SL connection to the communications apparatus based on the sidelink identifier of the communications apparatus, and performs SL communication by using the sidelink identifier of the communications apparatus as a destination address. Implementation is simple and practicable.

In a possible implementation, with reference to any one of the fifteenth aspect or the possible implementations of the fifteenth aspect, if the communications apparatus is target relay user equipment, the receiving unit is further configured to receive, from the network device, an announcement message used to trigger the target relay user equipment to establish a sidelink SL connection to the first user equipment, where the announcement message includes a radio network identifier of the first user equipment and/or a sidelink identifier of the first user equipment.

Based on the possible implementation, when the communications apparatus is used for forwarding data, the communications apparatus establishes the SL connection between the communications apparatus and the first user equipment. Implementation is simple and practicable.

In a possible implementation, with reference to any one of the fifteenth aspect or the possible implementations of the fifteenth aspect, the receiving unit is further configured to receive, from the network device, group scheduling information used to schedule data of communication between the first user equipment and the network device, where the group scheduling information includes a G-RNTI for group scheduling and time-frequency domain information for group scheduling.

Based on the possible implementation, the communications apparatus receives the group scheduling information from the network device, monitors the corresponding G-RNTI on a time domain resource and a frequency domain resource that are indicated by the time-frequency domain information, receive the data forwarded by the network device to the first user equipment, and send the received data to the first user equipment, to improve data transmission efficiency and reliability.

According to a seventeenth aspect, a communications apparatus is provided. The communications apparatus is a network device, or a chip or a system-on-a-chip in the network device. The communications apparatus implements functions performed by the network device in the foregoing aspects or possible designs. The functions are implemented by hardware. For example, in a possible design, the communications apparatus includes a processor and a transceiver. The processor is configured to: receive a discovery request message from first user equipment via the transceiver, obtain signal quality of a sidelink between second user equipment and the first user equipment through measurement based on the discovery request message, and send, to the network device via the transceiver, the signal quality of the sidelink between the second user equipment and the first user equipment and a radio network identifier that is of the second user equipment and that is used by the network device to uniquely identify the second user equipment. In another possible design, the communications apparatus further includes a memory. The memory is configured to store computer-executable instructions and data for the communications apparatus. When the communications apparatus runs, the processor executes the computer-executable instructions stored in the memory, so that the communications apparatus performs the relay communication method according to any one of the fifteenth aspect or the possible designs of the fifteenth aspect.

According to an eighteenth aspect, a computer-readable storage medium is provided. The computer-readable storage medium is a readable non-volatile storage medium. The computer-readable storage medium stores computer instructions or a program. When the computer instructions or the program is run on a computer, the computer is enabled to perform the relay communication method according to any one of the fifteenth aspect or the possible designs of the foregoing aspect.

According to a nineteenth aspect, a computer program product including instructions is provided. When the computer program product runs on a computer, the computer is enabled to perform the relay communication method according to any one of the fifteenth aspect or the possible designs of the foregoing aspect.

According to a twentieth aspect, a communications apparatus is provided. The communications apparatus is a network device or a chip or a system-on-a-chip in the network device. The communications apparatus includes one or more processors and one or more memories. The one or more memories are coupled to the one or more processors, and the one or more memories are configured to store computer program code. The computer program code includes computer instructions. When the one or more processors execute the computer instructions, the communications apparatus is enabled to perform the relay communication method according to any one of the fifteenth aspect or the possible designs of the fifteenth aspect.

According to a twenty-first aspect, a chip system is provided. The chip system includes one or more processors and one or more memories. The one or more memories are coupled to the one or more processors, and the one or more memories store computer program code or computer instructions. When the one or more processors execute the computer program code or the computer instructions, the chip system is enabled to perform the relay communication method according to any one of the fifteenth aspect or the possible designs of the fifteenth aspect.

For technical effects achieved by any one of the designs of the seventeenth aspect to the twenty-first aspect, refer to the technical effects achieved by any one of the fifteenth aspect or the possible designs of the fifteenth aspect. Details are not described again.

According to a twenty-second aspect, embodiments of this application provide a communications system. The communications system includes a network device including the communications apparatus according to any one of the second aspect to the seventh aspect, first user equipment including the communications apparatus according to any one of the ninth aspect to the fourteenth aspect, and second user equipment including the communications apparatus according to any one of the sixteenth aspect to the twenty-first aspect.

DESCRIPTION OF EMBODIMENTS

Currently, in user equipment (user equipment, UE) cooperation communication, to communicate with a network device, remote UE needs to discover relay UEs, select one relay UE from the relay UEs, and send a PC5 sidelink (PC5 sidelink, PC5-S) message to the selected relay UE, to trigger establishment of a connection and direct communication between the remote UE and the selected relay UE. The remote UE communicates with the network device via the relay UE, to improve data transmission performance. The network device is a base station. An existing manner of discovering relay UE by remote UE is shown in FIG. 1 or FIG. 2.

Figure 1:
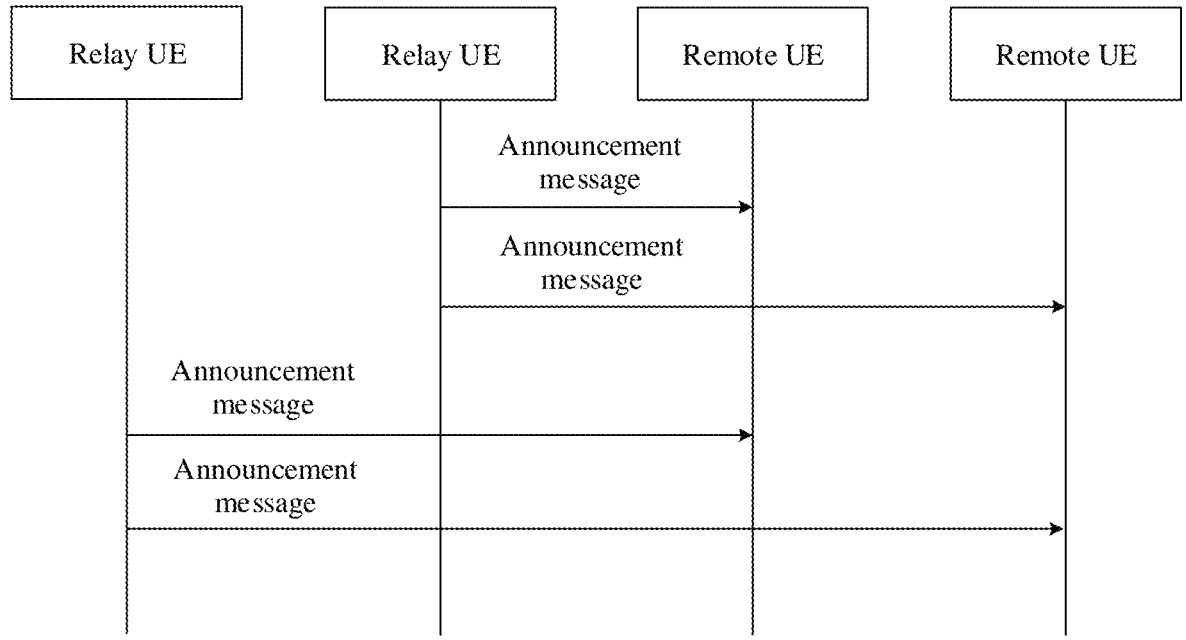
FIG. 1 is a schematic flowchart of discovering relay UE in a conventional technology.

As shown in FIG. 1, an existing method for discovering relay UE includes: Relay UEs send announcement (announcement) messages to surroundings of the relay UEs. After remote UE monitors (monitors) the announcement messages, the remote UE measures signal quality of the monitored announcement messages, and selects relay UE with better signal quality as relay UE that finally needs to be connected.

Figure 2:
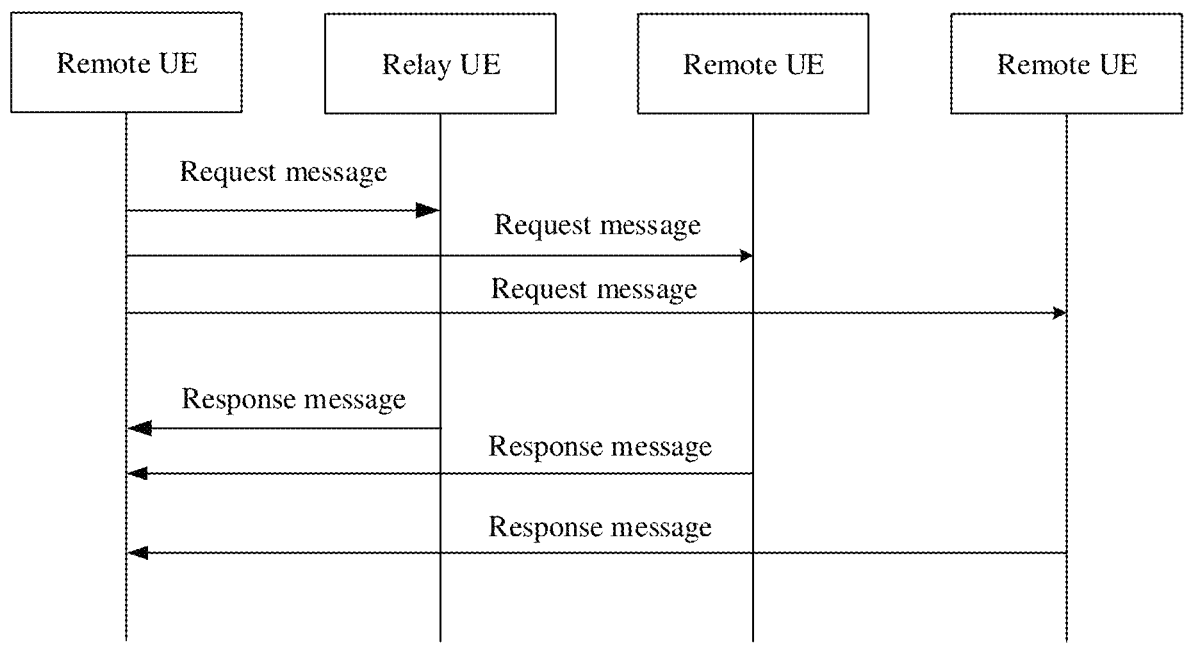
FIG. 2 is another schematic diagram of discovering relay UE in a conventional technology.

As shown in FIG. 2, another existing method for discovering relay UE includes: Remote UE sends a request message, for example, solicitation, to surroundings of the remote UE. After monitoring the request message, relay UEs return response (response) messages to the remote UE. The remote UE receives the response messages, measures signal quality of the received response messages, and selects relay UE with better signal quality as relay UE that finally needs to be connected.

To implement selection of relay UE by remote UE, before the method shown in FIG. 1 or FIG. 2 is performed, a network device broadcasts two thresholds to relay UEs over an air interface. For example, the network device broadcasts a threshold (threshold) 1 and a threshold 2 to the relay UEs, the relay UEs measure air interface signal quality, and relay UE whose air interface signal quality is within a range of the two thresholds sends the announcement message shown in FIG. 1 or the response message shown in FIG. 2. Similarly, the network device broadcasts a threshold to a plurality of remote UEs over an air interface. For example, the network device broadcasts a threshold 3 to the remote UEs, the remote UEs measure air interface signal quality, and remote UE whose air interface signal quality obtained through measurement is lower than the threshold sends the request message shown in FIG. 2.

It is learned from the foregoing that, in a conventional technology, remote UEs and relay UEs that perform UE cooperation communication need to be screened based on preset thresholds. Remote UE obtained through screening selects, according to the method shown in FIG. 1 or FIG. 2, one relay UE from relay UEs that are obtained through screening based on preset thresholds, establish a connection to the selected relay UE, and communicate with a network device via the relay UE. Screening of the remote UEs and the relay UEs based on the preset thresholds is loose, and information for relay UE selection is relatively limited. Consequently, selection of the relay UE is not accurate enough, and data forwarding performed via the relay UE selected by the remote UE is unable to meet a performance condition of a network system.

To resolve the foregoing technical problem, embodiments of this application provide a relay communication method. A network device obtains a measurement report that includes signal quality of a sidelink (sidelink, SL) between first user equipment and at least one second user equipment and a radio network identifier of the at least one second user equipment, selects target relay user equipment, of the first user equipment, from the at least one second user equipment based on the measurement report and selection assistance information associated with each second user equipment. In the method, the network device selects appropriate relay user equipment by comprehensively considering entire-network system performance. Therefore, performance of the selected relay user equipment is better, so that reliability of data transmission performed by remote user equipment via the relay user equipment is improved, and a performance condition of a network system is improved. For the method, refer to descriptions in the following embodiments corresponding to methods shown in FIG. 5 to FIG. 8A and FIG. 8B.

The following describes the relay communication method provided in embodiments of this application with reference to the accompanying drawings of this specification.

The relay communication method provided in embodiments of this application is applied to a communications system that supports UE cooperation communication, for example, is applied to any one of a 4$^{th}$ generation (4$^{th}$ generation, 4G) system, a long term evolution (long term evolution, LTE) system, a 5th generation (5th generation, 5G) system, a new radio (new radio, NR) system, or an NR vehicle-to-everything (vehicle-to-everything, V2X) system, and is further applied to another next-generation communications system. This is not limited. The following uses a communications system shown in FIG. 3 as an example to describe the method provided in embodiments of this application.

Figure 3:
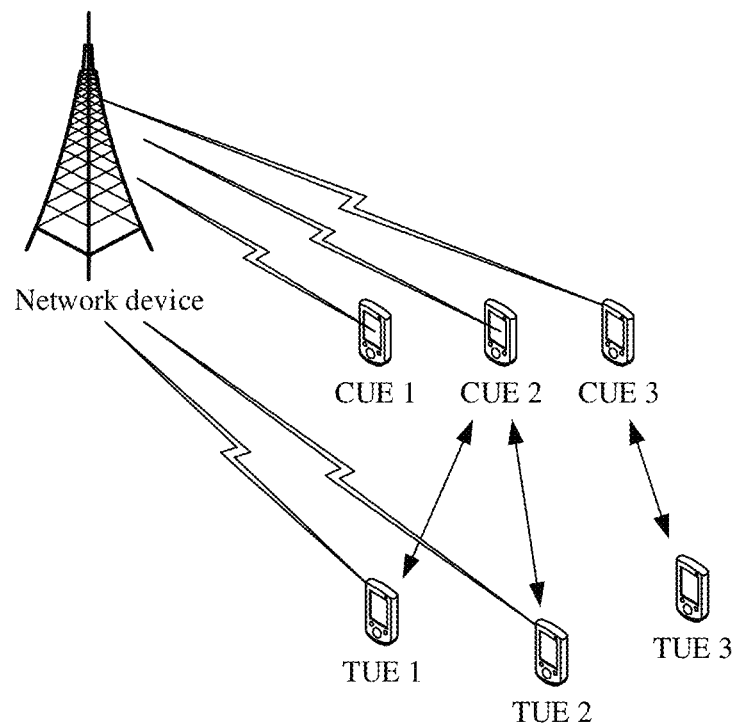
FIG. 3 is a simplified schematic diagram of a system architecture according to an embodiment of this application.

FIG. 3 is a schematic diagram of a communications system according to an embodiment of this application. As shown in FIG. 3, the communications system includes a network device and a plurality of user equipment. The plurality of user equipment includes cooperating user equipment (cooperating UEs, CUEs) and target user equipment (target UEs, TUEs). For example, the plurality of user equipment includes CUE 1 to CUE 3 and TUE 1 to TUE 3. CUE is located within coverage of the network device, establishes a wireless connection to the network device, and communicates with the network device over an air interface. In addition, TUE is located within coverage of the network device, establishes a wireless connection to the network device, and communicates with the network device over an air interface. Alternatively, TUE establishes an SL connection to CUE selected according to the method in embodiments of this application, and communicate with the network device via the CUE. For example, the TUE sends uplink data to the CUE on an SL. After receiving the uplink data, the CUE sends the uplink data to the network device over the air interface. The network device sends downlink data to the CUE. After receiving the downlink data, the CUE sends the downlink data to the TUE on the SL.

The network device is mainly configured to implement functions such as a physical layer function, resource scheduling and management, and access control and mobility management of a terminal. The network device is a device that supports wired access, or is a device that supports wireless access. For example, the network device is an access network (access network, AN) device/a radio access network (radio access network, RAN) device, and includes a plurality of 5G-AN/5G-RAN nodes. The 5G-AN/5G-RAN node is an access point (access point, AP), a base station (NodeB, NB), an enhanced base station (enhanced NodeB, eNB), a next-generation base station (NR NodeB, gNB), a transmission reception point (transmission reception point, TRP), a transmission point (transmission point, TP), another access node, or the like. In embodiments of this application, an apparatus configured to implement functions of the network device is the network device, or is an apparatus, for example, a chip system, that supports the network device in implementing the functions.

The user equipment is a terminal device (terminal equipment), a mobile station (mobile station, MS), a mobile terminal (mobile terminal, MT), or the like. The terminal is a mobile phone (mobile phone), a tablet computer, or a computer with a wireless transceiver function, or is a virtual reality (virtual reality, VR) terminal, an augmented reality (augmented reality, AR) terminal, a wireless terminal in industrial control, a wireless terminal in self-driving, a wireless terminal in telemedicine, a wireless terminal in a smart grid, a wireless terminal in a smart city (smart city), a smart home, a vehicle-mounted terminal, or the like. In embodiments of this application, an apparatus configured to implement functions of the CUE or the TUE is a terminal, or is an apparatus, for example, a chip system, that supports the terminal in implementing the functions.

FIG. 3 is an example accompanying drawing, and a quantity of nodes included in FIG. 3 is not limited. In addition to the function nodes shown in FIG. 3, the communications system further includes another node, for example, a core network device, a gateway device, or an application server. This is not limited. In addition, TUE and CUE in FIG. 3 are example names. The TUE alternatively is named as remote UE, first user equipment, or the like, and the CUE is named as relay UE, second user equipment, or the like. This is not limited. An example in which the TUE is first user equipment and the CUE is second user equipment is used below to describe the relay communication method provided in embodiments of this application.

Figure 4:
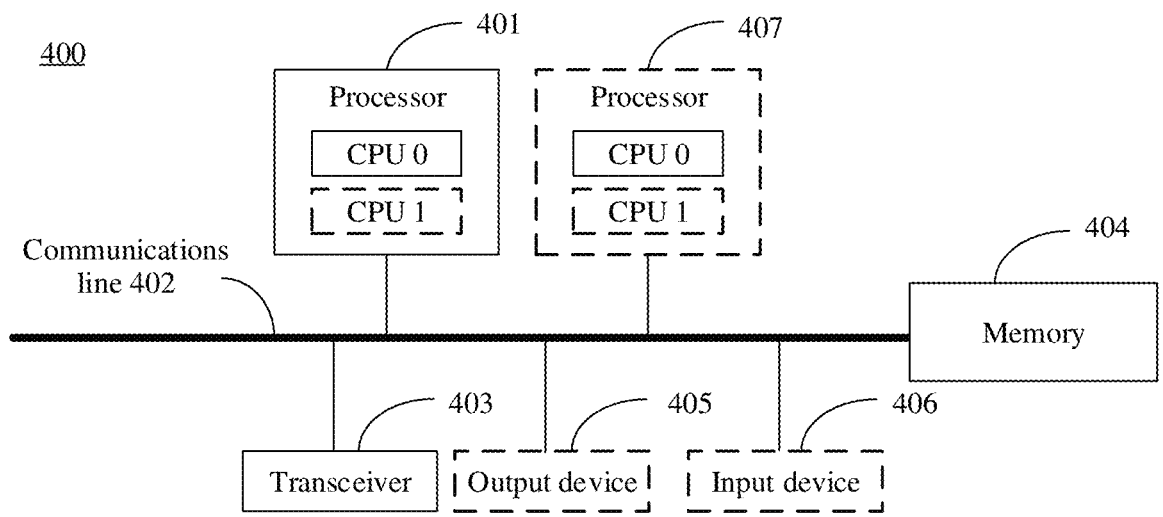
FIG. 4 is a schematic diagram of composition of a communications apparatus according to an embodiment of this application.

Network elements such as the CUE, the TUE, and the network device shown in FIG. 3 is in a composition structure shown in FIG. 4 or include components shown in FIG. 4. FIG. 4 is a schematic diagram of composition of a communications apparatus 400 according to an embodiment of this application. For example, when the communications apparatus 400 has functions of the network device in embodiments of this application, the communications apparatus 400 is a network device, or a chip or a system-on-a-chip in the network device. When the communications apparatus 400 has functions of user equipment (for example, first user equipment or second user equipment) in embodiments of this application, the communications apparatus 400 is the user equipment, or a chip or a system-on-a-chip in the user equipment.

As shown in FIG. 4, the communications apparatus 400 includes a processor 401, a communications line 402, and a transceiver 403. Further, the communications apparatus 400 includes a memory 404. The processor 401, the memory 404, and the transceiver 403 is connected to each other through the communications line 402.

The processor 401 is a central processing unit (central processing unit, CPU), a general-purpose network processor (network processor, NP), a digital signal processor (digital signal processor, DSP), a microprocessor, a microcontroller, a programmable logic device (programmable logic device, PLD), or any combination thereof. The processor 401 alternatively is any other apparatus having a processing function, for example, a circuit, a component, or a software module.

The communications line 402 is configured to transmit information between the components included in the communications apparatus 400.

The transceiver 403 is configured to communicate with another device or another communications network. The another communications network is the Ethernet, a radio access network (radio access network, RAN), a wireless local area network (wireless local area network, WLAN), or the like. The transceiver 403 is a radio frequency module or any apparatus that implements communication. In embodiments of this application, an example in which the transceiver 403 is a radio frequency module is used for description. The radio frequency module includes an antenna, a radio frequency circuit, and the like. The radio frequency circuit includes a radio frequency integrated chip, a power amplifier, and the like.

The memory 404 is configured to store instructions. The instructions are a computer program.

The memory 404 is a read-only memory (read-only memory, ROM) or another type of static storage device that stores static information and/or instructions, or is a random access memory (random access memory, RAM) or another type of dynamic storage device that stores information and/or instructions, or is an electrically erasable programmable read-only memory (electrically erasable programmable read-only memory, EEPROM), a compact disc read-only memory (compact disc read-only memory, CD-ROM) or another optical disk storage, an optical disc storage, or a magnetic disk storage medium or another magnetic storage device. The optical disc storage includes a compact disc, a laser disc, an optical disc, a digital versatile disc, a Blu-ray disc, and the like.

The memory 404 exists independently of the processor 401, or is integrated into the processor 401. The memory 404 is configured to store instructions, program code, some data, or the like. The memory 404 is located inside the communications apparatus 400, or is located outside the communications apparatus 400. This is not limited. The processor 401 is configured to execute the instructions stored in the memory 404, to implement the relay communication method provided in the following embodiments of this application.

In an example, the processor 401 includes one or more CPUs, for example, a CPU 0 and a CPU 1 in FIG. 4.

In an optional implementation, the communications apparatus 400 includes a plurality of processors. For example, the communications apparatus 400 further includes a processor 407 in addition to the processor 401 in FIG. 4.

In an optional implementation, the communications apparatus 400 further includes an output device 405 and an input device 406. For example, the input device 406 is a device such as a keyboard, a mouse, a microphone, or a joystick, and the output device 405 is a device such as a display screen or a speaker (speaker).

The communications apparatus 400 is a desktop computer, a portable computer, a network server, a mobile phone, a tablet computer, a wireless terminal, an embedded device, a chip system, or a device having a structure similar to that in FIG. 4. In addition, the composition structure shown in FIG. 4 does not constitute a limitation on the communications apparatus. In addition to the components shown in FIG. 4, the communications apparatus includes more or fewer components than those shown in the figure, or some components are combined, or different component arrangements are used.

In embodiments of this application, a chip system includes a chip, or includes a chip and another discrete component.

The following describes, with reference to the communications system shown in FIG. 3, the relay communication method provided in embodiments of this application. Each device in the following embodiments is configured to have the components shown in FIG. 4. In addition, actions, terms, and the like in embodiments of this application is mutually referenced. This is not limited. In embodiments of this application, names of messages exchanged between devices, names of parameters in the messages, or the like are examples. In implementation, other names alternatively is used. This is not limited.

Figure 5:
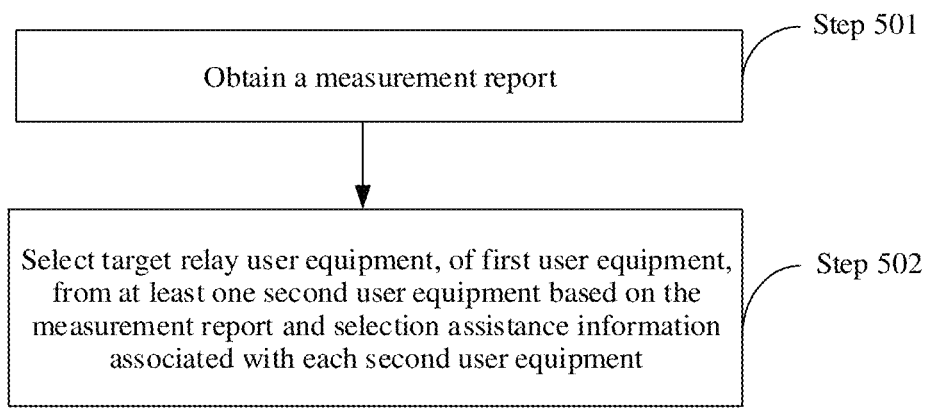
FIG. 5 is a flowchart of a relay communication method according to an embodiment of this application.

FIG. 5 shows a relay communication method according to an embodiment of this application. As shown in FIG. 5, the method includes the following steps.

Step 501: A network device obtains a measurement report.

The network device is the network device in the system shown in FIG. 3, or is a functional module, a chip, a system-on-a-chip, or the like in the network device shown in FIG. 3. This is not limited.

The measurement report includes signal quality of a sidelink between first user equipment and at least one second user equipment and a radio network identifier of the at least one second user equipment. The first user equipment is any TUE that is in the system shown in FIG. 3, or a functional module, a chip, or a system-on-a-chip in the TUE. The first user equipment is located within coverage of the network device, or is unable to be located within coverage of the network device. The at least one second user equipment is the CUE that is in the system shown in FIG. 3 and that supports direct communication with the first user equipment, or a functional module, a chip, a system-on-a-chip, or the like in the CUE.

Signal quality of a sidelink between the first user equipment and second user equipment is determined based on reference signal received power (reference signal received power, RSRP), reference signal received quality (reference signal received quality, RSRQ), a signal to interference plus noise ratio (signal to interference plus noise ratio, SINR), or a received signal strength indicator (received signal strength indicator, RSSI) transmitted on the sidelink.

A radio network identifier of second user equipment is used by the network device to uniquely identify the second user equipment. The radio network identifier of the second user equipment is configured by the network device for the second user equipment. For example, the radio network identifier of the second user equipment is a radio access network identifier (radio access network identifier, RAN ID), and includes a cell identifier (cell ID) and a cell radio network temporary identifier (cell radio network temporary identifier, C-RANTI). Radio network identifiers of different second user equipment are different. For example, as shown in FIG. 3, assuming that second user equipment are CUE 1, CUE 2, and CUE 3, radio network identifiers of the three second user equipment is a UE ID 1, a UE ID 2, and a UE ID 3, and radio network identifiers of three second user equipment are different.

For example, the network device obtains the measurement report in the following Manner (1), Manner (2), or Manner (3).

Manner (1): The first user equipment obtains the measurement report through measurement, and the network device receives, over an air interface between the network device and the first user equipment, the measurement report reported by the first user equipment.

Figure 6:
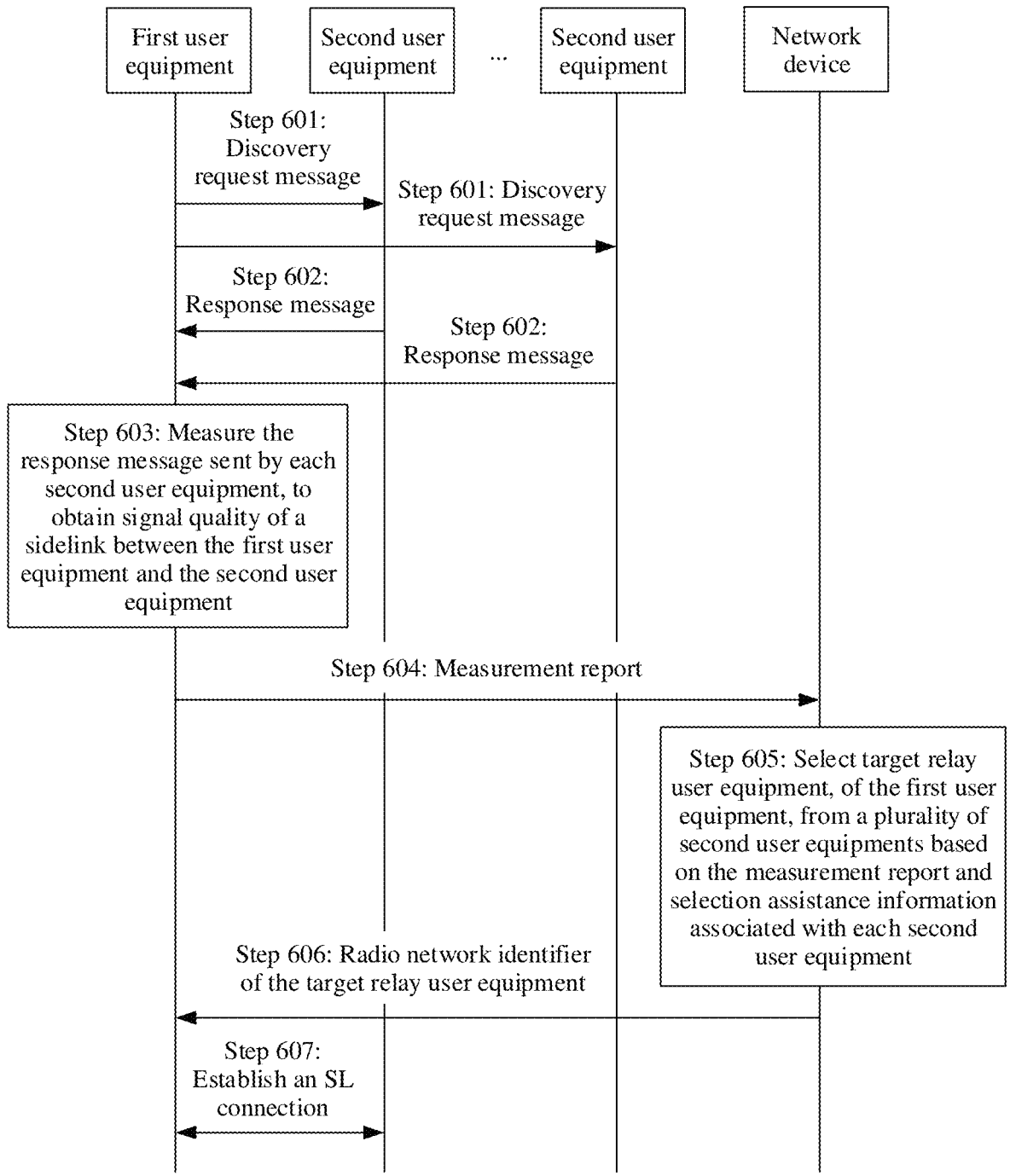
FIG. 6 is a flowchart of another relay communication method according to an embodiment of this application.

For an implementation process of Manner (1), refer to descriptions in an embodiment corresponding to FIG. 6.

Manner (2): The first user equipment obtains the measurement report through measurement, and sends the measurement report to initial relay user equipment. The network device receives the measurement report reported by the initial relay user equipment.

The initial relay user equipment is one second user equipment selected by the first user equipment from the at least one second user equipment, and an SL connection is established between the first user equipment and the initial relay user equipment.

Figure 7A:
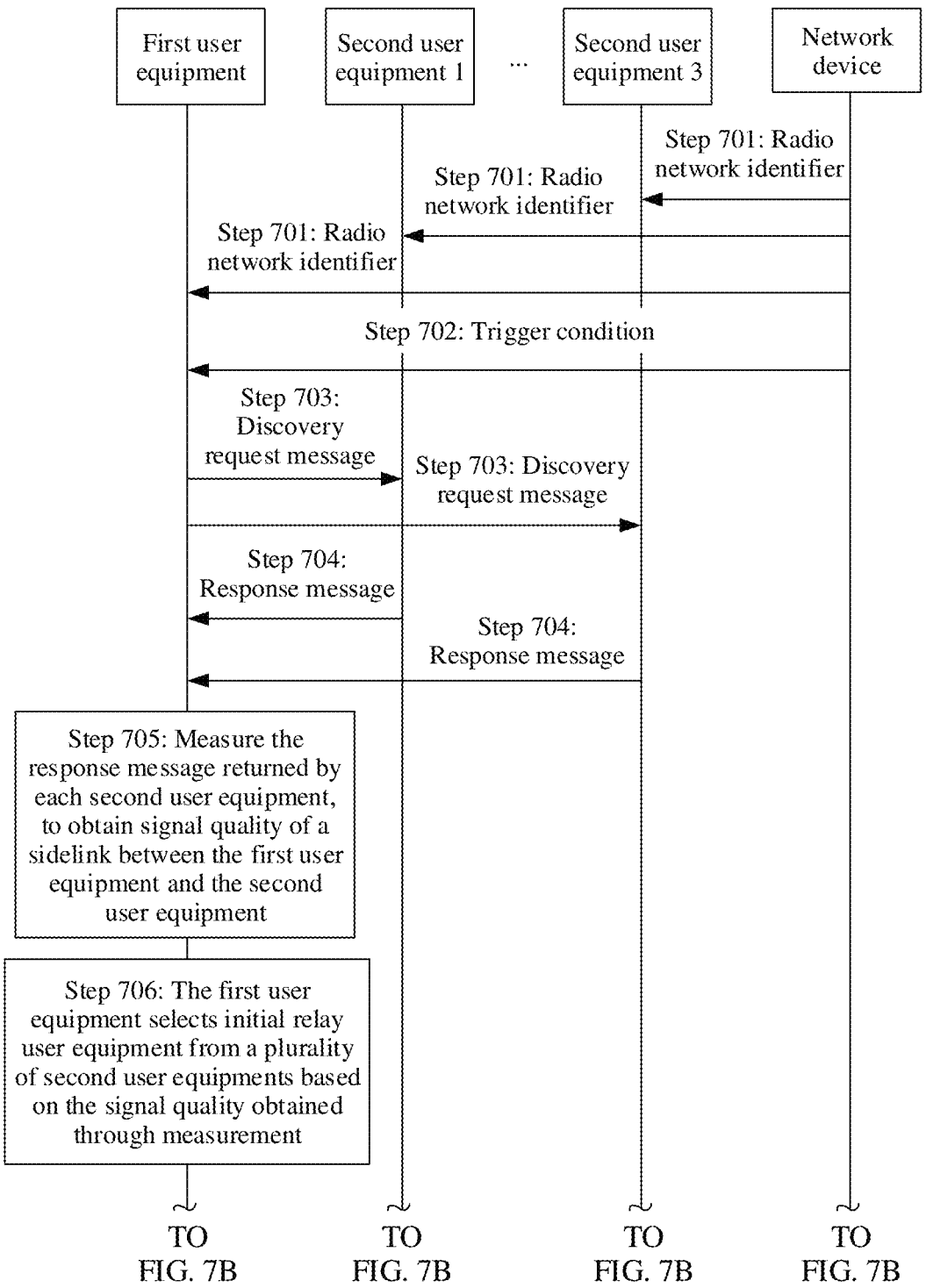
FIG. 7A and FIG. 7B are a flowchart of still another relay communication method according to an embodiment of this application.
Figure 7B:
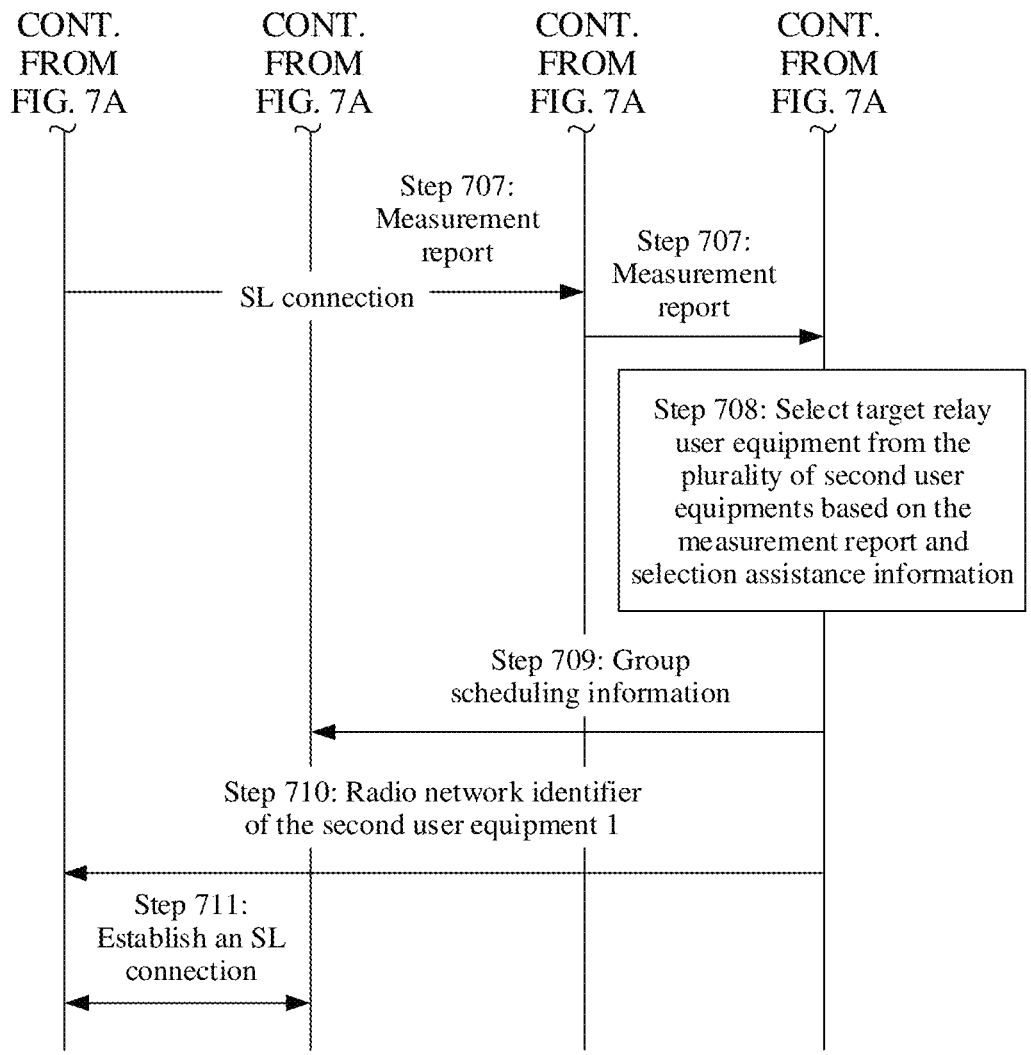

For an implementation process of Manner (2), refer to descriptions in an embodiment corresponding to FIG. 7A and FIG. 7B.

Manner (3): Each second user equipment measures signal quality of a sidelink between the second user equipment and the first user equipment, and the network device receives the signal quality of the sidelink between the second user equipment and the first user equipment and a radio network identifier of the second user equipment from the second user equipment over an air interface between the network device and the second user equipment.

Figure 8A:
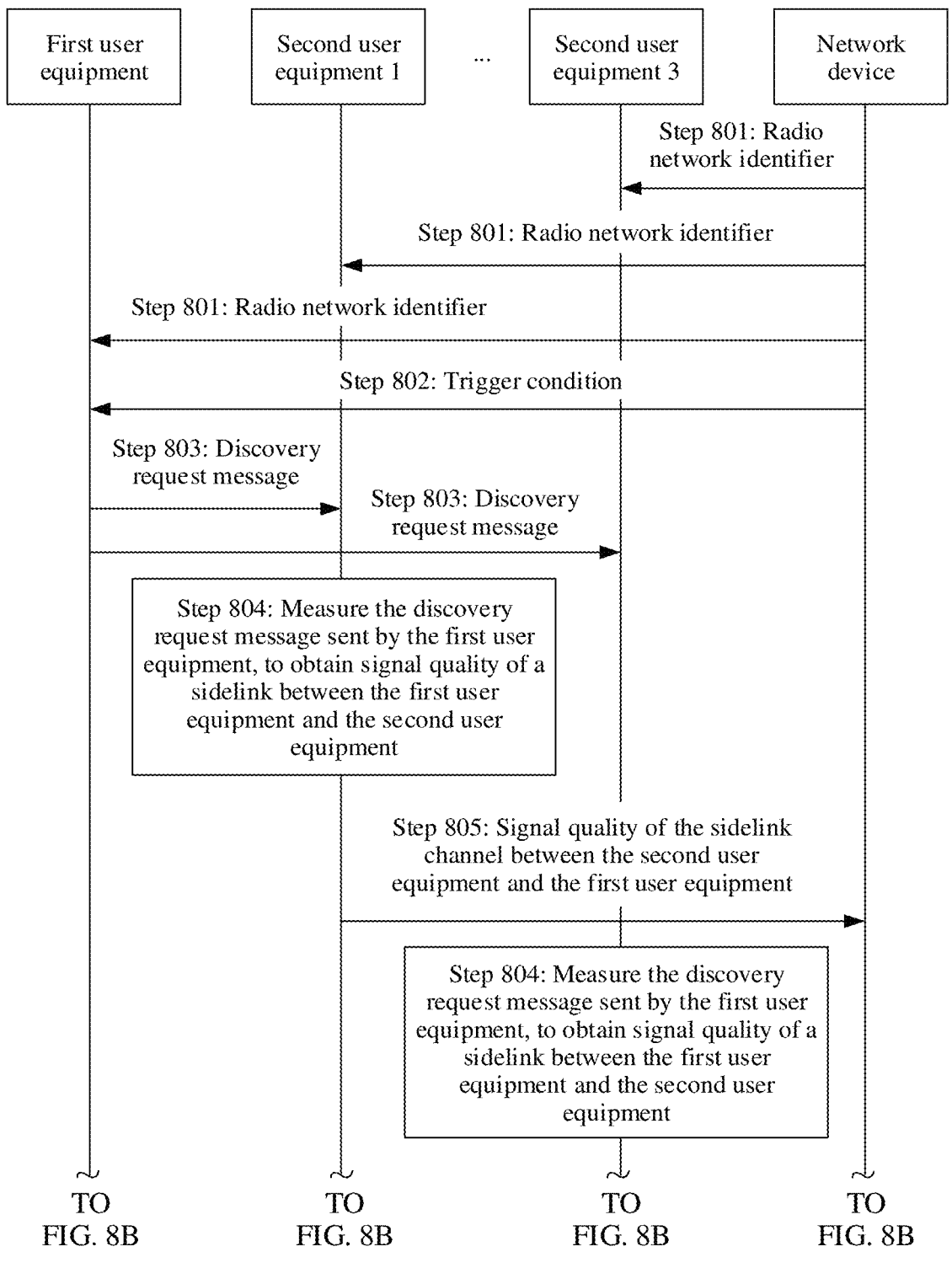
FIG. 8A and FIG. 8B are a flowchart of yet another relay communication method according to an embodiment of this application.
Figure 8B:
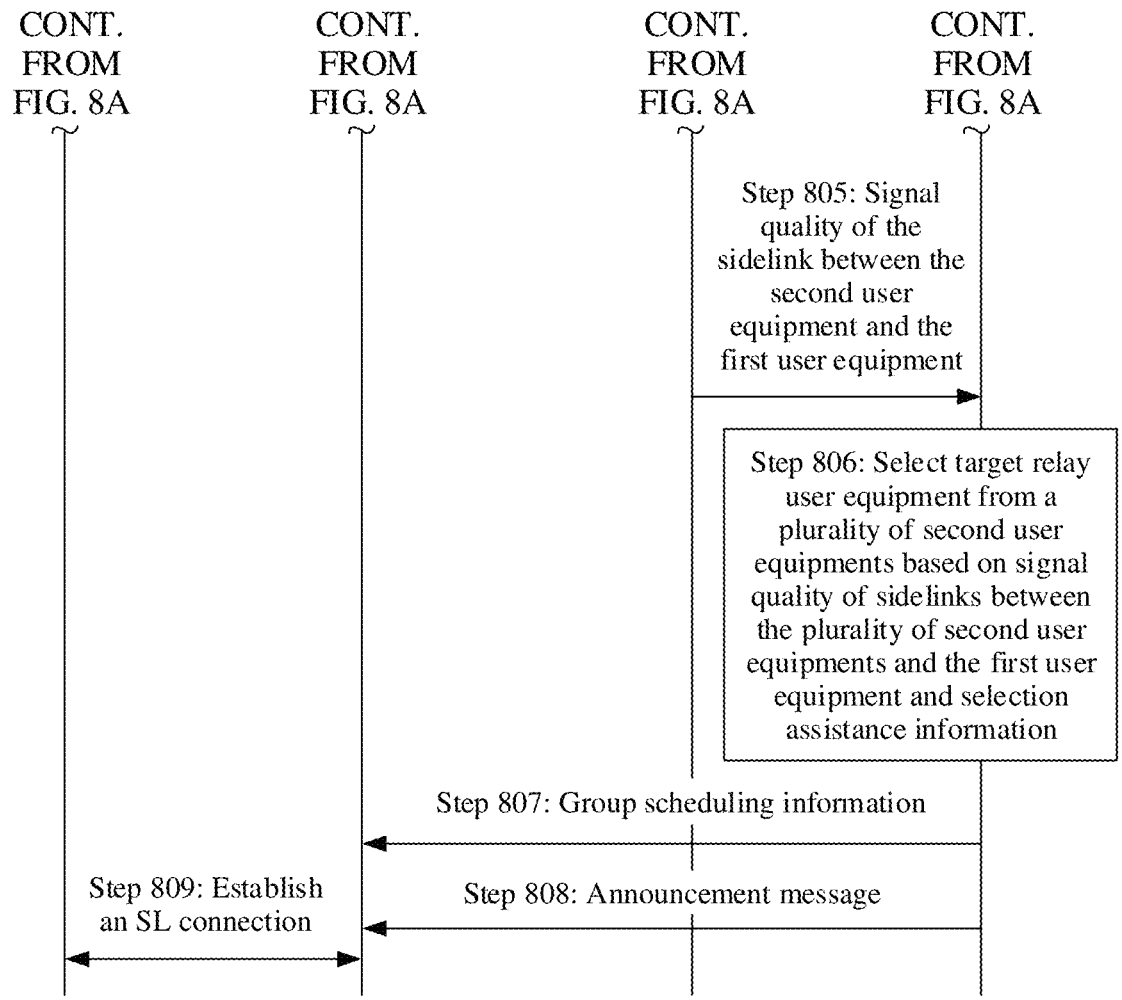

For an implementation process of Manner (3), refer to descriptions in an embodiment corresponding to FIG. 8A and FIG. 8B.

Step 502: The network device selects target relay user equipment, of the first user equipment, from the at least one second user equipment based on the measurement report and selection assistance information associated with each second user equipment.

The selection assistance information includes one or more of the following information: subscription information of the second user equipment, air interface signal quality of the second user equipment, air interface signal quality of the first user equipment, load information of the second user equipment, and interference information of the second user equipment. For example, the selection assistance information includes the subscription information of the second user equipment. Alternatively, the selection assistance information includes the air interface signal quality of the second user equipment. Alternatively, the selection assistance information includes the air interface signal quality of the first user equipment. Alternatively, the selection assistance information includes the subscription information of the second user equipment, the air interface signal quality of the second user equipment, and the air interface signal quality of the first user equipment.

The subscription information of the second user equipment refers to information that the second user equipment subscribes to when the second user equipment accesses a network, and includes a service type supported by the second user equipment, a quality of service (quality of service, QoS) condition of the second user equipment, and the like.

The air interface signal quality of the second user equipment refers to signal quality on the air interface between the second user equipment and the network device, for example, RSRP, RSRQ, an SINR, or an RSSI on the air interface between the second user equipment and the network device. In embodiments of this application, an air interface is referred to as a Uu interface or the like. This is not limited.

The air interface signal quality of the first user equipment refers to signal quality on the air interface between the first user equipment and the network device, for example, RSRP, RSRQ, an SINR, or an RSSI on the air interface between the first user equipment and the network device.

The load information of the second user equipment includes an amount of data forwarded by the second user equipment.

The interference information of the second user equipment includes information about another user equipment that causes interference to data forwarding performed by the second user equipment.

The target relay user equipment is one or more user equipment that are selected by the network device and that are configured to forward data for the first user equipment.

For example, the selection assistance information includes the air interface signal quality of the second user equipment. That the network device selects target relay user equipment, of the first user equipment, from the at least one second user equipment based on the measurement report and selection assistance information associated with each second user equipment includes:

The network device uses, as the target relay user equipment, second user equipment with better air interface signal quality in second user equipment with high sidelink signal quality in the at least one second user equipment.

For example, the selection assistance information includes the load information of the second user equipment. That the network device selects target relay user equipment, of the first user equipment, from the at least one second user equipment based on the measurement report and selection assistance information associated with each second user equipment includes:

The network device uses, as the target relay user equipment, second user equipment with smaller load in second user equipment with high sidelink signal quality in the at least one second user equipment.

Similarly, for example, the selection assistance information includes the subscription information of the second user equipment, the air interface signal quality of the second user equipment, the air interface signal quality of the first user equipment, the load information of the second user equipment, and the interference information of the second user equipment. The network device uses, as the target relay user equipment, second user equipment with a higher QoS condition, better air interface signal quality, smaller load, and less interference in second user equipment with high sidelink signal quality in the at least one second user equipment.

According to the method in FIG. 5, the network device selects the appropriate target relay user equipment based on the signal quality of the SL between the first user equipment and the second user equipment, the selection assistance information associated with each second user equipment, and the like, and notifies the first user equipment of the selected relay user equipment. After receiving a selection result of the network device, the first user equipment is triggered to establish an SL connection to the selected relay user equipment, and communicates with the network device via the relay user equipment that establishes the SL connection to the first user equipment. In this way, the network device selects the appropriate relay user equipment based on an entire-network communication status such as a communication status between the first user equipment and the second user equipment and other selection assistance information. Selecting the appropriate relay user equipment by comprehensively considering entire-network system performance improves reliability of data transmission performed by remote user equipment via the relay user equipment, and improves a performance condition of a network system.

Further, optionally, to enable the first user equipment to establish the SL connection between the first user equipment and the target relay user equipment, the method shown in FIG. 3 further includes: The network device obtains a sidelink identifier of each second user equipment, and sends a radio network identifier of the target relay user equipment and/or a sidelink identifier of the target relay user equipment to the first user equipment. The first user equipment establishes the SL connection to the target relay user equipment based on the radio network identifier of the target relay user equipment and/or the sidelink identifier of the target relay user equipment, and forwards data via the target relay user equipment. That is, the first user equipment initiates establishment of the SL connection to the target relay user equipment.

The sidelink identifier of each second user equipment is used for sidelink SL communication between the first user equipment and the second user equipment. For example, the sidelink identifier of each second user equipment is used as a target address and is included at a media access control (media access control, MAC) layer of the first user equipment when the first user equipment and the second user equipment establish an SL connection. The sidelink identifier of the second user equipment is referred to as an SL ID or a layer 2 identifier (Layer2 ID).

A MAC layer data packet sent by the first user equipment includes a sidelink identifier of the first user equipment and the sidelink identifier of the second user equipment. In this case, the sidelink identifier of the first user equipment is a source address, and the sidelink identifier of the second user equipment is the target address.

Alternatively, the network device is unable to notifies the target relay user equipment to establish the SL connection between the target relay user equipment and the first user equipment. For example, the network device further obtains a radio network identifier of the first user equipment and/or a sidelink identifier of the first user equipment, and send an announcement message including the radio network identifier of the first user equipment and/or the sidelink identifier of the first user equipment to the target relay user equipment, to trigger the target relay user equipment to establish the SL connection to the first user equipment.

The radio network identifier of the first user equipment is allocated by the network device, and the radio network identifier of the first user equipment is used by the network device to uniquely identify the first user equipment. For related descriptions of the first user equipment, refer to the foregoing related descriptions of the second user equipment. Details are not described again.

The sidelink identifier of the first user equipment is used for SL communication between the first user equipment and the at least one second user equipment. For example, the sidelink identifier of the first user equipment is used as a target address and is included in a MAC layer of second user equipment when the first user equipment and the second user equipment establish an SL connection. The sidelink identifier of the first user equipment further is referred to as an SL ID or a layer 2 identifier (Layer2 ID), and the sidelink identifier of the first user equipment is different from a sidelink identifier of second user equipment.

Further, the method shown in FIG. 3 further includes: The network device sends, to the target relay user equipment, group scheduling information used to schedule data of communication between the first user equipment and the network device, so that the target relay user equipment monitors a corresponding G-RNTI on a time domain resource and a frequency domain resource that are indicated by time-frequency domain information, and receives the data sent by the network device to the first user equipment.

The group scheduling information includes the G-RNTI for group scheduling and the time-frequency domain information for group scheduling. The G-RNTI is used to scramble the data sent by the network device to the first user equipment. The time-frequency domain information is used to indicate the time domain resource, the frequency domain resource, or the like occupied by the data sent by the network device to the first user equipment.

The following describes in detail the method shown in FIG. 5 with reference to embodiments corresponding to FIG. 6 to FIG. 8A and FIG. 8B.

FIG. 6 shows a relay communication method according to an embodiment of this application. First user equipment sends a measurement report to a network device over an air interface. As shown in FIG. 6, the method includes the following steps.

Step 601: The first user equipment sends discovery request (discovery request) messages to a plurality of second user equipment through broadcast.

The first user equipment and each second user equipment is UE preconfigured or specified by a network for UE cooperation communication. The first user equipment is any TUE that is in the system shown in FIG. 3, or a functional module, a chip, or a system-on-a-chip in the TUE. The first user equipment is located within coverage of the network device. The second user equipment is the CUE that is in the system shown in FIG. 3 and that supports direct communication with the first user equipment, or a functional module, a chip, a system-on-a-chip, or the like in the CUE. For example, the first user equipment is the TUE 1, the TUE 2, or the TUE 3 in FIG. 3, and the plurality of second user equipment includes the CUE 1, the CUE 2, and the CUE 3 in FIG. 3. A quantity of second user equipment is not limited in this application. There is two, three, or more second user equipment. This is not limited.

The discovery request message is replaced with a solicitation message, and the discovery request message is used to discover relay UEs around the first user equipment. For example, the first user equipment sends the discovery request messages to the plurality of second user equipment when a trigger condition is met. In other words, the first user equipment sends the discovery request messages to the plurality of second user equipment once the trigger condition is met.

The trigger condition includes that signal quality on the air interface between the first user equipment and the network device is less than or equal to a first threshold. The first threshold is set. When the signal quality on the air interface between the first user equipment and the network device is less than or equal to the first threshold, quality on the air interface between the first user equipment and the network device is poor, and unsuitable to transmit data over the air interface. When the signal quality on the air interface between the first user equipment and the network device is greater than the first threshold, quality on the air interface between the first user equipment and the network device is good, and data is directly transmitted to the network device over the air interface.

For example, the trigger condition is configured by the network device for the first user equipment before step 601 is performed. For example, before step 601, the first user equipment receives a radio resource control (radio resource control, RRC) message from the network device, where the RRC message carries the trigger condition, and the first user equipment obtains the trigger condition from the RRC message.

The trigger condition alternatively is named as a CUE discovery configuration, another name, or the like. This is not limited.

Step 602: Each second user equipment receives the discovery request message, and sends a response message to the first user equipment.

The response message corresponds to the discovery request message, and the response message is used to indicate that the second user equipment is around the first user equipment. The response message includes a radio network identifier of the second user equipment, and further includes a sidelink identifier of the second user equipment and other information. This is not limited.

For related descriptions of the radio network identifier of the second user equipment and the sidelink identifier of the second user equipment, refer to the descriptions in the embodiment corresponding to FIG. 5. Details are not described again.

The radio network identifier of the second user equipment is configured by the network device for the second user equipment before the method shown in FIG. 6 is performed. For example, before step 602 is performed, the second user equipment receives an RRC message from the network device, where the RRC message carries the radio network identifier of the second user equipment. The second user equipment obtains the radio network identifier of the second user equipment from the RRC message, includes the radio network identifier of the second user equipment in the response message, and sends the response message to the first user equipment.

For example, the second user equipment sends the response message to the first user equipment in a unicast manner.

Step 603: The first user equipment receives the response message sent by each second user equipment, and measures the response message sent by the second user equipment, to obtain signal quality of a sidelink between the first user equipment and the second user equipment.

The first user equipment measures one or more types of information such as RSRP, RSRQ, an SINR, or an RSSI of the response message sent by the second user equipment, to obtain the signal quality of the sidelink between the first user equipment and the second user equipment. For example, the RSRP is used as an example. If the RSRP of the response message is large, the signal quality of the sidelink between the first user equipment and the second user equipment is high. Alternatively, if the RSRP of the response message is small, the signal quality of the sidelink between the first user equipment and the second user equipment is low.

Step 604: The first user equipment sends the measurement report to the network device.

The measurement report includes signal quality of the response messages sent by the plurality of second user equipment and radio network identifiers of the plurality of second user equipment, and further includes other information such as a sidelink identifier of the first user equipment and sidelink identifiers of the second user equipment. This is not limited.

The signal quality of the sidelink between the first user equipment and the second user equipment and the radio network identifier of the second user equipment are correspondingly included in the measurement report. For example, the signal quality of the sidelink between the first user equipment and the second user equipment and the radio network identifier of the second user equipment is correspondingly included in the measurement report in an array form. For example, assuming that the second user equipment include the CUE 1, the CUE 2, and the CUE 3, and radio network identifiers of the three second user equipment are a UE ID 1, a UE ID 2, and a UE ID 3, the measurement report is {UE ID 1, signal quality of a sidelink between the first user equipment and the CUE 1}, {UE ID 2, signal quality of a sidelink between the first user equipment and the CUE 2}, and {UE ID 3, signal quality of a sidelink between the first user equipment and the CUE 3}.

In an example, the first user equipment sends the measurement report to the network device over the air interface.

In another example, the first user equipment selects one second user equipment from the plurality of second user equipment as initial relay user equipment, establish an SL connection to the initial relay user equipment, and send the measurement report to the initial relay user equipment on an SL, so that the initial relay user equipment sends the measurement report to the network device over an air interface. For an implementation, refer to descriptions in an embodiment corresponding to FIG. 7A and FIG. 7B.

In still another example, the first user equipment is configured to use, based on the signal quality of the response messages sent by the plurality of second user equipment, second user equipment that sends a response message with higher signal quality as the initial relay user equipment, or randomly selects one second user equipment from the plurality of second user equipment as the initial relay user equipment. This is not limited.

Step 605: The network device receives the measurement report, and selects target relay user equipment, of the first user equipment, from the plurality of second user equipment based on the measurement report and selection assistance information associated with each second user equipment.

For step 605, refer to step 502. Details are not described again.

Step 606: The network device sends a radio network identifier of the target relay user equipment to the first user equipment.

In an example, when the first user equipment sends the measurement report to the network device over the air interface, the network device sends the radio network identifier of the target relay user equipment to the first user equipment over the air interface.

In another example, when the first user equipment sends the measurement report to the network device via the initial relay user equipment selected by the first user equipment, the network device sends the radio network identifier of the target relay user equipment to the first user equipment via the initial relay user equipment, or directly sends the radio network identifier of the target relay user equipment to the first user equipment over the air interface.

Further, when the measurement report includes the sidelink identifiers of the plurality of second user equipment, in addition to sending the radio network identifier of the target relay user equipment to the first user equipment, the network device further sends a sidelink identifier of the target relay user equipment to the first user equipment, so that the first user equipment establishes an SL connection to the target relay user equipment based on the sidelink identifier of the target relay user equipment.

Step 607: The first user equipment receives the radio network identifier of the target relay user equipment, establishes the SL connection to the target relay user equipment, and communicates with the network device via the target relay user equipment.

When the first user equipment establishes the SL connection to the initial relay user equipment and sends the measurement report to the network device via the initial relay user equipment, if the target relay user equipment finally selected by the network device is the same as the initial relay user equipment, the first user equipment still maintains the SL connection between the first user equipment and the initial relay user equipment, and communicates with the network device via the initial relay user equipment. Alternatively, if the target relay user equipment finally selected by the network device is different from the initial relay user equipment, the first user equipment releases/breaks the SL connection between the first user equipment and the initial relay user equipment, establishes the SL connection to the target relay user equipment through an existing SL establishment procedure, and communicates with the network device via the target relay user equipment.

For example, the first user equipment is the TUE 2 in FIG. 3, and the plurality of second user equipment is the CUE 1 to the CUE 3 in FIG. 3. When step 604 is performed, the TUE 2 selects the CUE 2 from the CUE 1 to the CUE 3 as the initial relay user equipment, establishes an SL connection to the CUE 2, and sends the measurement report to the network device via the CUE 2. Subsequently, if the network device selects the CUE 1 from the CUE 1 to the CUE 3 as the target relay user equipment, in other words, the TUE 2 finally needs to communicate with the network device via the CUE 1, after receiving a selection result of the network device, the TUE 2 releases the SL connection between the TUE 2 and the CUE 2, establishes an SL connection to the CUE 1, and communicates with the network device via the CUE 1. If the network device selects the CUE 2 from the CUE 1 to the CUE 3 as the target relay user equipment, in other words, the TUE 2 finally needs to communicate with the network device via the CUE 2, after receiving a selection result of the network device, the TUE 2 maintains the SL connection between the TUE 2 and the CUE 2, and communicates with the network device via the CUE 2.

Further, in the first implementation of the method shown in FIG. 6, after step 604 is performed, the method further includes: The network device sends group scheduling information to the target relay user equipment.

For related descriptions of the group scheduling information, refer to the descriptions in the embodiment corresponding to FIG. 5. Details are not described again.

According to the method in FIG. 6, the network device selects the appropriate relay user equipment based on the signal quality of the SL between the first user equipment and the second user equipment, other selection assistance information, and the like, and notifies the first user equipment of the selected relay user equipment. After receiving a selection result of the network device, the first user equipment is triggered to establish the SL connection to the selected relay user equipment, and communicates with the network device via the relay user equipment that establishes an SL to the first user equipment. In this way, the network device selects the appropriate relay user equipment based on an entire-network communication status, to improve reliability of data transmission performed by remote user equipment via the relay user equipment, and improve a performance condition of a network system.

The following describes in detail the method shown in FIG. 6 by using an example in which first user equipment selects initial relay user equipment and sends a measurement report to a network device via the initial relay user equipment.

FIG. 7A and FIG. 7B show a relay communication method according to an embodiment of this application. As shown in FIG. 7A and FIG. 7B, the method includes the following steps.

Step 701: A network device configures radio network identifiers for first user equipment and second user equipment that is used for UE cooperation communication.

For related descriptions of the radio network identifier of the first user equipment and the radio network identifier of the second user equipment, refer to the descriptions in the embodiment corresponding to FIG. 5. Details are not described again.

Step 702: The network device configures a trigger condition for the first user equipment.

For related descriptions of the trigger condition, refer to the descriptions in the embodiment corresponding to FIG. 5. Details are not described again.

For example, the network device configures the trigger condition for the first user equipment based on an RRC message. For example, the network device sends the RRC message to the first user equipment, where the RRC message carries the trigger condition.

Step 703: When the trigger condition is met, the first user equipment sends discovery request messages to a plurality of second user equipment.

For step 703, refer to step 601. Details are not described again.

Step 704: The second user equipment receive the discovery request messages, and return response messages to the first user equipment.

For step 704, refer to step 602. Details are not described again.

Step 705: The first user equipment receives the response messages returned by the plurality of second user equipment, and measures the response message returned by each second user equipment, to obtain signal quality of a sidelink between the first user equipment and the second user equipment.

For step 705, refer to step 603. Details are not described again.

Step 706: The first user equipment selects initial relay user equipment from the plurality of second user equipment based on the signal quality obtained through measurement.

The initial relay user equipment is second user equipment 3 in FIG. 7A and FIG. 7B.

For example, the first user equipment randomly selects one second user equipment from the plurality of second user equipment as the initial relay user equipment, or selects second user equipment with better signal quality as the initial relay user equipment.

Step 707: The first user equipment establishes an SL connection to the initial relay user equipment, and sends a measurement report to the network device via the initial relay user equipment.

For a manner in which the first user equipment establishes an SL connection to the initial relay user equipment, refer to an existing SL connection establishment process. Details are not described again. For example, that the first user equipment sends a measurement report to the network device via the initial relay user equipment includes: The first user equipment sends the measurement report to the initial relay user equipment on an SL, and the initial relay user equipment receives the measurement report, and sends the measurement report to the network device over an air interface.

Step 708: The network device receives the measurement report, and selects target relay user equipment from the plurality of second user equipment based on the measurement report and selection assistance information.

The target relay user equipment is second user equipment 1 in FIG. 7A and FIG. 7B.

For step 708, refer to step 604. Details are not described again.

Step 709: The network device sends group scheduling information to the second user equipment 1.

For related descriptions of the group scheduling information, refer to the descriptions in the first implementation of FIG. 6. Details are not described again.

Step 710: The network device sends a radio network identifier of the second user equipment 1 to the first user equipment.

For step 710, refer to step 605. Details are not described again.

A sequence of performing step 709 and step 710 is not limited in this embodiment of this application. Step 709 is performed first, or step 710 is performed first, or step 710 is performed before step 709, or step 709 and step 710 is simultaneously performed. This is not limited.

Step 711: The first user equipment receives the radio network identifier of the second user equipment 1, releases the SL connection between the first user equipment and the second user equipment 3, establishes an SL connection to the second user equipment 1, and communicates with the network device via the second user equipment 1.

For step 711, refer to step 606. Details are not described again.

Based on the method shown in FIG. 7A and FIG. 7B, the first user equipment sends, to the network device via relay user equipment autonomously selected by the first user equipment, the measurement report that includes signal quality of sidelinks between the first user equipment and the plurality of second user equipment. The network device selects the appropriate relay user equipment based on the measurement report, other selection assistance information, and the like, and notifies the first user equipment of the selected relay user equipment. After receiving a selection result of the network device, the first user equipment is triggered to establish the SL connection to the selected relay user equipment, and subsequently communicates with the network device via the relay user equipment that establishes the SL connection to the first user equipment. In this way, the network device selects the appropriate relay user equipment based on an entire-network communication status, to improve reliability of data transmission performed by remote UE via the relay user equipment, and improve a performance condition of a network system.

FIG. 6, FIG. 7A, and FIG. 7B are described by using an example in which the first user equipment sends the measurement report to the network device. Alternatively, the second user equipment reports signal quality of sidelinks between the second user equipment and the first user equipment to the network device, so that the network device selects the appropriate relay user equipment based on selection assistance information and the signal quality of the sidelinks that is reported by the plurality of second user equipment. For the alternative method, refer to FIG. 8A and FIG. 8B.

FIG. 8A and FIG. 8B show a relay communication method according to an embodiment of this application. As shown in FIG. 8A and FIG. 8B, the method includes the following steps.

Step 801: A network device configures radio network identifiers for first user equipment and second user equipment that is used for UE cooperation communication.

For step 801, refer to step 701. Details are not described again.

Step 802: The network device configures a trigger condition for the first user equipment.

For step 802, refer to step 702. Details are not described again.

Step 803: When the trigger condition is met, the first user equipment sends discovery request messages to a plurality of second user equipment.

For step 803, refer to step 703. Details are not described again.

Step 804: Each second user equipment receives the discovery request message, and measures the discovery request message sent by the first user equipment, to obtain signal quality of a sidelink between the first user equipment and the second user equipment.

For example, the second user equipment measures one or more types of information such as RSRP, RSRQ, an SINR, or an RSSI of the discovery request message sent by the first user equipment, to obtain the signal quality of the sidelink between the first user equipment and the second user equipment. For example, the RSRP is used as an example. If the RSRP of the discovery request message is large, the signal quality of the sidelink between the first user equipment and the second user equipment is high. Alternatively, if the RSRP of the discovery request message is small, the signal quality of the sidelink between the first user equipment and the second user equipment is low.

Step 805: Each second user equipment sends the signal quality of the sidelink between the second user equipment and the first user equipment to the network device. Further, the second user equipment sends a sidelink identifier of the second user equipment to the network device.

Step 806: The network device receives the signal quality that is of the sidelink between each second user equipment and the first user equipment and that is sent by the second user equipment, and selects target relay user equipment, for example, second user equipment 1, from the plurality of second user equipment based on signal quality of sidelinks between the plurality of second user equipment and the first user equipment and selection assistance information.

For a process in which the network device selects target relay user equipment, refer to step 607 in FIG. 6. Details are not described again.

Step 807: The network device sends group scheduling information to the second user equipment 1.

For related descriptions of the group scheduling information, refer to the descriptions in the first implementation of FIG. 6. Details are not described again.

Step 808: The network device sends an announcement message to the second user equipment 1.

The announcement message is used to notify or trigger the second user equipment 1 to establish an SL connection between the second user equipment 1 and the first user equipment.

A sequence of performing step 807 and step 808 is not limited in this embodiment of this application. Step 807 is performed first, or step 808 is performed first, or step 808 is performed before step 807, or step 807 and step 808 is simultaneously performed. This is not limited.

Step 809: The second user equipment 1 establishes the SL connection to the first user equipment.

For example, for establishment of the SL connection between the second user equipment 1 and the first user equipment, refer to an existing SL connection establishment process. Details are not described again. Subsequently, the first user equipment communicates with the network device via the second user equipment 1.

Based on the method shown in FIG. 8A and FIG. 8B, the plurality of second user equipment sends, to the network device, the measurement report that includes the signal quality of the sidelinks between the first user equipment and the second user equipment. The network device selects the appropriate relay user equipment based on the signal quality of the sidelinks between the first user equipment and the plurality of second user equipment, other selection assistance information, and the like, and notifies the first user equipment of the selected relay user equipment. After receiving a selection result of the network device, the first user equipment is triggered to establish the SL connection to the selected relay user equipment, and subsequently communicates with the network device via the relay user equipment that establishes the SL connection to the first user equipment. In this way, the network device selects the appropriate relay user equipment based on an entire-network communication status, to improve reliability of data transmission performed by remote UE via the relay user equipment, and improve a performance condition of a network system.

The foregoing mainly describes the solutions provided in embodiments of this application from a perspective of interaction between network elements. To implement the foregoing functions, the communications apparatuses such as the network device, the first user equipment, and the second user equipment include corresponding hardware structures and/or software modules for performing the functions. A person skilled in the art is easily be aware that, in combination with the examples of units and algorithm steps described in embodiments disclosed in this specification, this application is implemented by hardware or a combination form of hardware and computer software. Whether a function is performed by hardware or hardware driven by computer software depends on particular applications and design constraints of the technical solutions. A person skilled in the art is configured to use different methods to implement the described functions for each particular application, but implementation that goes beyond the scope of this application is unrealistic.

In embodiments of this application, functional module division is performed on the network device, the first user equipment, and the second user equipment based on the foregoing method examples. For example, each functional module is obtained through division corresponding to each function, or two or more functions are integrated into one processing module. The integrated module is implemented in a form of hardware, or is implemented in a form of a software functional module. In embodiments of this application, division into the modules is an example, and is a logical function division. In actual implementation, another division manner is used.

Figure 9:
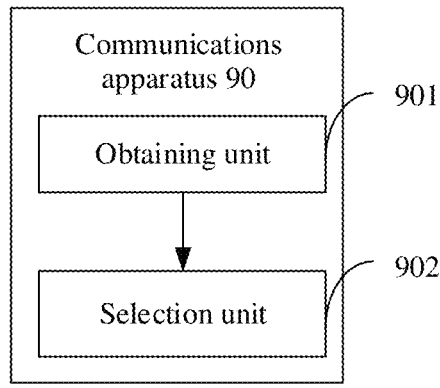
FIG. 9 is a schematic diagram of composition of a communications apparatus 90 according to an embodiment of this application.

When each functional module is obtained through division based on each corresponding function, FIG. 9 is a diagram of a structure of a communications apparatus 90. The communications apparatus 90 is a network device, or a chip or a system-on-a-chip in the network device. The communications apparatus 90 is configured to perform functions of the network device in the foregoing embodiments. The communications apparatus 90 shown in FIG. 9 includes an obtaining unit 901 and a selection unit 902.

The obtaining unit 901 is configured to obtain a measurement report that includes signal quality of an SL between first user equipment and at least one second user equipment and a radio network identifier of the at least one second user equipment. For example, the obtaining unit 901 supports the communications apparatus 90 in performing step 501, step 605, step 708, and step 806.

The selection unit 902 is configured to select target relay user equipment, of the first user equipment, from the at least one second user equipment based on the measurement report and selection assistance information associated with each second user equipment. For example, the selection unit supports the communications apparatus 90 in performing step 502, step 605, step 708, and step 806.

For an implementation of the communications apparatus, refer to behavior functions of the network device in the methods shown in FIG. 5 to FIG. 8A and FIG. 8B.

In another possible implementation, the obtaining unit 901 and the selection unit 902 in FIG. 9 is replaced with a processor, and functions of the obtaining unit 901 and the selection unit 902 is integrated into the processor. Optionally, the communications apparatus 90 shown in FIG. 9 further includes a memory. When the obtaining unit 901 and the selection unit 902 in FIG. 9 are replaced with the processor, the communications apparatus 90 in this embodiment of this application is the communications apparatus shown in FIG. 4.

Figure 10:
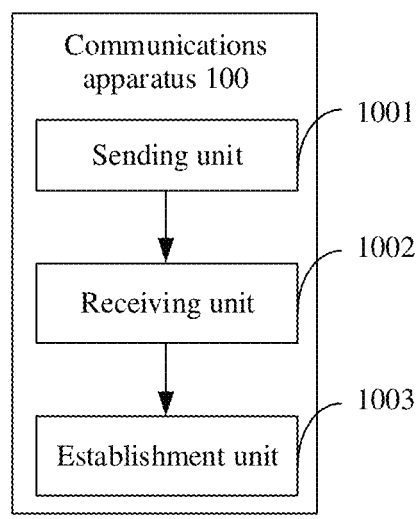
FIG. 10 is a schematic diagram of composition of a communications apparatus 100 according to an embodiment of this application.

FIG. 10 is a diagram of a structure of a communications apparatus 100. The communications apparatus 100 is second user equipment, or a chip or a system-on-a-chip in the second user equipment. The communications apparatus 100 is configured to perform functions of the second user equipment in the foregoing embodiments. In a possible implementation, the communications apparatus 100 shown in FIG. 10 includes a sending unit 1001, a receiving unit 1002, and an establishment unit 1003.

The sending unit 1001 is configured to send a measurement report that includes signal quality of a sidelink between first user equipment and at least one second user equipment and a radio network identifier of the at least one second user equipment to a network device. For example, the sending unit 1001 supports the communications apparatus 100 in performing step 604 and step 707.

The receiving unit 1002 is configured to receive a radio network identifier of target relay user equipment from the network device, where the target relay user equipment is one second user equipment selected from the at least one second user equipment. For example, the receiving unit 1002 supports the communications apparatus 100 in performing step 606, step 709, and step 807.

The establishment unit 1003 is configured to: establish a sidelink SL connection to the target relay user equipment based on the radio network identifier of the target relay user equipment, and communicate with the network device via the target relay user equipment. For example, the establishment unit 1003 is configured to support the communications apparatus 100 in performing step 607, step 711, and step 809.

For an implementation of the communications apparatus 100, refer to behavior functions of the second user equipment in the relay communication method shown in FIG. 6 or FIG. 8A and FIG. 8B.

In another possible implementation, the sending unit 1001 and the receiving unit 1002 in FIG. 10 is replaced with a transceiver or a transceiver unit, and functions of the sending unit 1001 and the receiving unit 1002 is integrated into the transceiver. Optionally, the communications apparatus 100 shown in FIG. 10 further includes a processor and a memory. When the sending unit 1001 and the receiving unit 1002 are replaced with the transceiver or the transceiver unit, the communications apparatus 100 in this embodiment of this application is the communications apparatus shown in FIG. 4.

Figure 11:
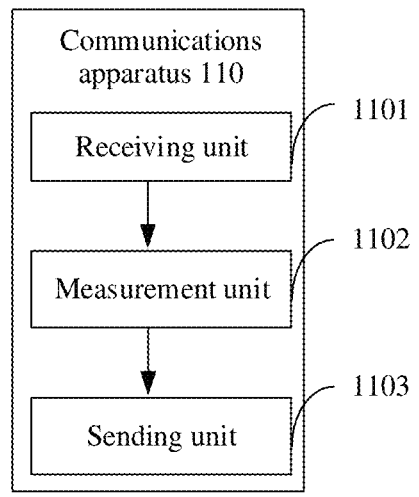
FIG. 11 is a schematic diagram of composition of a communications apparatus 110 according to an embodiment of this application.

FIG. 11 is a diagram of a structure of a communications apparatus 110. The communications apparatus 110 is second user equipment, or a chip or a system-on-a-chip in the second user equipment. The communications apparatus 110 is configured to perform functions of the second user equipment in the foregoing embodiments. In a possible implementation, the communications apparatus 110 shown in FIG. 11 includes a receiving unit 1101, a measurement unit 1102, and a sending unit 1103.

The receiving unit 1101 is configured to receive a discovery request message from first user equipment. For example, the receiving unit 1101 supports the communications apparatus 110 in performing step 803.

The measurement unit 1102 is configured to obtain signal quality of a sidelink between the communications apparatus 110 and the first user equipment through measurement based on the discovery request message. For example, the measurement unit 1102 supports the communications apparatus 110 in performing step 804.

The sending unit 1103 is configured to send, to a network device, the signal quality of the sidelink between the second user equipment and the first user equipment and a radio network identifier that is of the second user equipment and that is used by the network device to uniquely identify the second user equipment. For example, the sending unit 1103 supports the communications apparatus 110 in performing step 805.

For an implementation of the communications apparatus 110, refer to behavior functions of the second user equipment in the relay communication method shown in FIG. 6 or FIG. 8A and FIG. 8B.

In another possible implementation, the sending unit 1103 and the receiving unit 1101 in FIG. 11 is replaced with a transceiver or a transceiver unit, and functions of the sending unit 1101 and the receiving unit 1103 is integrated into the transceiver. Optionally, the communications apparatus 110 shown in FIG. 11 further includes a processor and a memory. When the sending unit 1101 and the receiving unit 1103 are replaced with the transceiver or the transceiver unit, the communications apparatus 110 in this embodiment of this application is the communications apparatus shown in FIG. 4.

Figure 12:
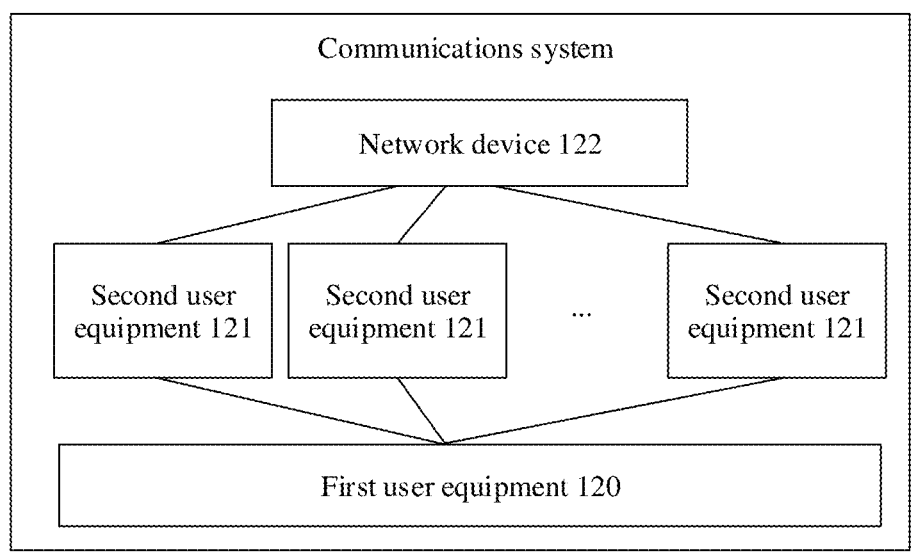
FIG. 12 is a schematic diagram of composition of a communications system according to an embodiment of this application.

FIG. 12 is a diagram of a structure of a communications system according to an embodiment of this application. As shown in FIG. 12, the system includes first user equipment 120, second user equipment 121, and a network device 122.

The network device 122 has a function of the communications apparatus 90 shown in FIG. 9. The first user equipment 120 has a function of the communications apparatus 100 shown in FIG. 10. The second user equipment 121 has a function of the communications apparatus 110 shown in FIG. 11. Details are not described again.

An embodiment of this application further provides a computer-readable storage medium. All or some of the processes in the foregoing method embodiments are completed by a computer program instructing related hardware. The program is stored in the foregoing computer-readable storage medium. When the program is executed, the processes of the foregoing method embodiments are performed. The computer-readable storage medium is an internal storage unit of the communications apparatus (including a data transmit end and/or a data receive end) in any one of the foregoing embodiments, for example, a hard disk or a memory of the communications apparatus. Alternatively, the computer-readable storage medium is an external storage device of the communications apparatus, for example, a plug-in hard disk, a smart media card (smart media card, SMC), a secure digital (secure digital, SD) card, or a flash card (flash card) that is configured on the communications apparatus. Further, the computer-readable storage medium alternatively includes both the internal storage unit and the external storage device of the communications apparatus. The computer-readable storage medium is configured to store the computer program, and other programs and data that are configured to be used by the communications apparatus. The computer-readable storage medium is further configured to temporarily store data that has been output or is to be output.

In the specification, claims, and accompanying drawings of this application, terms "first", "second", and the like are intended to distinguish between different objects but do not indicate a particular order. In addition, the terms "including", "having", and any other variant thereof are intended to cover a non-exclusive inclusion. For example, a process, method, system, product, or device that includes a series of steps or units is not limited to the listed steps or units, but optionally further includes an unlisted step or unit, or optionally further includes another inherent step or unit of the process, method, product, or device.

In this application, "at least one (item)" means one or more, "a plurality of" means two or more, and "at least two (items)" means two, three, or more. The term "and/or" is used to describe an association relationship between associated objects, and indicates that three relationships exists. For example, "A and/or B" indicates the following three cases: A exists, B exists, and both A and B exist, where A and B is singular or plural. The character "/" generally indicates an "or" relationship between the associated objects. "At least one of the following" or similar expressions indicate any combination of the following, including one or any combination of two or more of the following. For example, at least one of a, b, or c indicates: a, b, c, "a and b", "a and c", "b and c", or "a, b and c", where a, b, and c each is singular or plural.

Based on the foregoing descriptions of the implementations, a person skilled in the art clearly understands that for the purpose of convenient and brief descriptions, division into the foregoing functional modules is used as an example for descriptions. During actual application, the foregoing functions is allocated to different functional modules for implementation based on a condition, in other words, an inner structure of an apparatus is divided into different functional modules to implement all or a part of the functions described above.

In the several embodiments provided in this application, the disclosed apparatuses and methods are implemented in other manners. For example, the described apparatus embodiments are examples. For example, division into the modules or units is logical function division. There is another division manner in actual implementation. For example, a plurality of units or components are combined or is integrated into another apparatus, or some features are ignored or not be performed. In addition, the displayed or discussed mutual coupling or direct coupling or communication connection is implemented through some interfaces. The indirect coupling or communication connection between the apparatuses or units are implemented in electrical, mechanical, or another form.

The units described as separate parts are or are unable to be physically separate, and parts displayed as units are one or more physical units, in other words, is located in one place, or is distributed on different places. Some or all of the units are selected based on an actual condition to achieve the objectives of the solutions in embodiments.

In addition, functional units in embodiments of this application is integrated into one processing unit, or each of the units exists alone physically, or two or more units are integrated into one unit. The integrated unit is implemented in a form of hardware, or is implemented in a form of a software functional unit.

When the integrated unit is implemented in the form of a software functional unit and sold or used as an independent product, the integrated unit is stored in a readable storage medium. Based on such an understanding, the technical solutions in embodiments of this application essentially, or the part contributing to a conventional technology, or all or some of the technical solutions are implemented in a form of a software product. The software product is stored in a storage medium and includes several instructions for instructing a device (which is a single-chip microcomputer, a chip, or the like) or a processor (processor) to perform all or some of the steps of the methods described in embodiments of this application. The foregoing storage medium includes: any medium that stores program code, such as a USB flash drive, a removable hard disk, a ROM, a RAM, a magnetic disk, or an optical disc.

The foregoing descriptions are implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A relay communication method, comprising:
obtaining, by a network device, a measurement report that includes:
signal quality of a sidelink between first user equipment and at least one second user equipment;
a radio network identifier of the at least one second user equipment; and
a radio network identifier of a first of the at least one second user equipment is used by the network device to identify the first of the at least one second user equipment;
selecting, by the network device, target relay user equipment, of the first user equipment, from the at least one second user equipment based on the measurement report and selection assistance information associated with each second user equipment; and
obtaining, by the network device, a sidelink identifier of the at least one second user equipment, wherein a sidelink identifier of each second user equipment is used for sidelink (SL) communication between the first user equipment and the first of the at least one second user equipment.

2. The method according to claim 1, wherein:
the selection assistance information includes one or more of the following information:
subscription information of the first of the at least one second user equipment;
air interface signal quality of the first of the at least one second user equipment;
air interface signal quality of the first user equipment;
load information of the first of the at least one second user equipment; and
interference information of the first of the at least one second user equipment.

3. The method according to claim 1, wherein the obtaining, by the network device, the measurement report further comprising:
receiving, by the network device, the measurement report from the first user equipment over an air interface between the network device and the first user equipment;
receiving, by the network device, the measurement report from initial relay user equipment, wherein the initial relay user equipment is a second of the at least one second user equipment selected by the first user equipment from the at least one second user equipment; or
receiving, by the network device, signal quality of a sidelink between each second user equipment and the first user equipment and a radio network identifier of the second of the at least one second user equipment from the at least one second user equipment over an air interface between the network device and the second user equipment.

4. The method according to claim 1, further comprising:
sending, by the network device, a radio network identifier of the target relay user equipment or a sidelink identifier of the target relay user equipment to the first user equipment.

5. The method according to claim 1, further comprising:
obtaining, by the network device, a radio network identifier of the first user equipment or a sidelink identifier of the first user equipment, wherein:
the radio network identifier of the first user equipment is allocated by the network device; and
the sidelink identifier of the first user equipment is used for SL communication between the first user equipment and the at least one second user equipment.

6. The method according to claim 5, further comprising:
sending, by the network device, an announcement message to the target relay user equipment, wherein:
the announcement message is used to trigger the target relay user equipment to establish an SL connection to the first user equipment; and
the announcement message includes the radio network identifier of the first user equipment or the sidelink identifier of the first user equipment.

7. The method according to claim 1, further comprising:
sending, by the network device, group scheduling information to the target relay user equipment, wherein:
the group scheduling information is used to schedule data of communication between the first user equipment and the network device; and
the group scheduling information includes a group radio network temporary identifier (G-RNTI) for group scheduling and time-frequency domain information for the group scheduling.

8. The method according to claim 1, further comprising:
configuring, by the network device, a trigger condition for the first user equipment, wherein:
the trigger condition is configured to be used to trigger the first user equipment to send a discovery request message to the at least one second user equipment.

9. The method according to claim 8, wherein:
the trigger condition includes air interface signal quality of the first user equipment being less than or equal to a first threshold.

10. The method according to claim 1, wherein:
the radio network identifier of the first of the at least one second user equipment comprises a cell identifier (cell ID) and a cell radio network temporary identifier (C-RNTI).

11. An apparatus, comprising:
one or more processors;
a non-transitory memory coupled to the one or more processors, wherein the non-transitory memory stores a program to be executed by the one or more processors, the program including instructions to:
obtain, by the one or more processors, a measurement report that includes:
signal quality of a sidelink between first user equipment and at least one second user equipment;
a radio network identifier of the at least one second user equipment; and
a radio network identifier of a first of the at least one second user equipment is used by a network device to identify the first of the at least one second user equipment;
select, by the one or more processors, target relay user equipment, of the first user equipment, from the at least one second user equipment based on the measurement report and selection assistance information associated with each second user equipment; and
obtain, by the one or more processors, a sidelink identifier of the at least one second user equipment, wherein a sidelink identifier of each second user equipment is used for sidelink (SL) communication between the first user equipment and the first of the at least one second user equipment.

12. The apparatus according to claim 11, wherein the selection assistance information includes-one or more of the following information:

subscription information of the first of the at least one second user equipment;

air interface signal quality of the first of the at least one second user equipment;

air interface signal quality of the first user equipment;

load information of the first of the at least one second user equipment; and interference information of the first of the at least one second user equipment.

13. The apparatus according to claim 11, wherein the instructions that cause the one or more processors to obtain the measurement report further includes instructions that cause the one or more processors to:

receive, by the one or more processors, the measurement report from the first user equipment over an air interface between the apparatus and the first user equipment;

receive, by the one or more processors, the measurement report from initial relay user equipment, wherein:
the initial relay user equipment is a second of the at least one second user equipment selected by the first user equipment from the at least one second user equipment; or receive, by the one or more processors, signal quality of a sidelink between each second user equipment and the first user equipment and a radio network identifier of the second of the at least one second user equipment from the second of the at least one second user equipment over an air interface between the apparatus and the second of the at least one second user equipment.

14. The apparatus according to claim 11, wherein the instructions further cause the one or more processors to:

send, by the one or more processors, a radio network identifier of the target relay user equipment or a sidelink identifier of the target relay user equipment to the first user equipment.

15. The apparatus according to claim 11, wherein the instructions further cause the one or more processors to:

obtain, by the one or more processors, a radio network identifier of the first user equipment or a sidelink identifier of the first user equipment, wherein:
the radio network identifier of the first user equipment is allocated by the one or more processors; and
the sidelink identifier of the first user equipment is used for SL communication between the first user equipment and the at least one second user equipment.

16. The apparatus according to claim 15, wherein the instructions further cause the one or more processors to:

send, by the one or more processors, an announcement message to the target relay user equipment, wherein:
the announcement message is used to trigger the target relay user equipment to establish an SL connection to the first user equipment; and
the announcement message includes the radio network identifier of the first user equipment or the sidelink identifier of the first user equipment.

17. The apparatus according to claim 11, wherein the instructions further cause the one or more processors to:

send, by the one or more processors, group scheduling information to the target relay user equipment, wherein:
the group scheduling information is used to schedule data of communication between the first user equipment and the one or more processors and
the group scheduling information includes a group radio network temporary identifier (G-RNTI) for group scheduling and time-frequency domain information for the group scheduling.

18. A non-transitory computer readable medium that stores instructions executable by a computer, and the instructions cause the computer to:

obtain, by a network device, a measurement report, wherein the measurement report includes:
signal quality of a sidelink between first user equipment and at least one second user equipment;
a radio network identifier of the at least one second user equipment; and
a radio network identifier of a first of the at least one second user equipment is used by the network device to identify the first of the at least one second user equipment;

select, by the network device, target relay user equipment, of the first user equipment, from the at least one second user equipment based on the measurement report and selection assistance information associated with each second user equipment; and obtain, by the one or more processors, a sidelink identifier of the at least one second user equipment, wherein a sidelink identifier of each second user equipment is used for sidelink (SL) communication between the first user equipment and the first of the at least one second user equipment.

* * * * *